US010434969B2

(12) United States Patent
Yamada

(10) Patent No.: US 10,434,969 B2
(45) Date of Patent: Oct. 8, 2019

(54) AIRBAG DEVICE FOR A FRONT PASSENGER SEAT

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 64 days.

(21) Appl. No.: 15/647,356

(22) Filed: Jul. 12, 2017

(65) Prior Publication Data

US 2018/0022303 A1    Jan. 25, 2018

(30) Foreign Application Priority Data

Jul. 20, 2016  (JP) ................................ 2016-142667

(51) Int. Cl.
*B60R 21/205* (2011.01)
*B60R 21/2338* (2011.01)
(Continued)

(52) U.S. Cl.
CPC .......... *B60R 21/205* (2013.01); *B60R 21/237* (2013.01); *B60R 21/2338* (2013.01);
(Continued)

(58) Field of Classification Search
CPC . B60R 21/205; B60R 21/233; B60R 21/2338; B60R 2021/0004;
(Continued)

(56) References Cited

U.S. PATENT DOCUMENTS 7,152,880 B1 * 12/2006 Pang ..................... B60R 21/233
                                                              280/743.2
7,350,807 B2    4/2008 Schneider et al.
(Continued)

FOREIGN PATENT DOCUMENTS

JP    2016-020116 A    2/2016
JP    2016-40160 A     3/2016

OTHER PUBLICATIONS

Office Action dated Jun. 18, 2019 issued in corresponding JP patent application No. 2016-142667 (and English translation).

*Primary Examiner* — Barry Gooden, Jr.
(74) *Attorney, Agent, or Firm* — Posz Law Group, PLC

(57) ABSTRACT

An airbag includes a main inflatable section which includes a front-collision arresting face at the rear plane as deployed, a protruding inflatable section which includes an oblique-collision arresting face, and an arresting recess formed between the front-collision arresting face and oblique-collision arresting face. The airbag internally includes a recess-pulling tether which joints the leading end of the arresting recess and a front end portion of the airbag as deployed, and a regulating tether which extends from the leading end of the arresting recess towards a far-side wall of the protruding inflatable section which is opposed to the oblique-collision arresting face. A joint position of the regulating tether to the far-side wall is such a position that would produce a pulling force which pulls the protruding inflatable section towards the rear plane of the main inflatable section when the leading end of the arresting recess moves forward at catching a passenger.

7 Claims, 20 Drawing Sheets

(51) Int. Cl.
   *B60R 21/237* (2006.01)
   *B60R 21/00* (2006.01)
(52) U.S. Cl.
   CPC . *B60R 2021/0004* (2013.01); *B60R 2021/006* (2013.01); *B60R 2021/0048* (2013.01); *B60R 2021/23382* (2013.01)
(58) Field of Classification Search
   CPC .... B60R 2021/0023; B60R 2021/0048; B60R 2021/23308; B60R 2021/23382
   See application file for complete search history.

(56) References Cited

U.S. PATENT DOCUMENTS

| | | | |
|---|---|---|---|
| 8,882,138 B1* | 11/2014 | Hicken | B60R 21/231 280/730.1 |
| 9,187,055 B1* | 11/2015 | Genthikatti | B60R 21/2338 |
| 9,272,684 B1* | 3/2016 | Keyser | B60R 21/237 |
| 9,758,123 B2* | 9/2017 | Yamada | B60R 21/2338 |
| 10,023,144 B2* | 7/2018 | Taguchi | B60R 21/205 |
| 2003/0234520 A1* | 12/2003 | Hawthorn | B60R 21/16 280/728.1 |
| 2005/0098994 A1* | 5/2005 | Matsumura | B60R 21/231 280/743.1 |
| 2006/0186656 A1 | 8/2006 | Kumagai | |
| 2006/0249934 A1* | 11/2006 | Hasebe | B60R 21/231 280/729 |
| 2007/0250912 A1 | 10/2007 | Rassool et al. | |
| 2008/0048420 A1* | 2/2008 | Washino | B60R 21/203 280/731 |
| 2009/0302587 A1* | 12/2009 | Thomas | B60R 21/231 280/743.2 |
| 2010/0102542 A1* | 4/2010 | Nakajima | B60R 21/233 280/743.2 |
| 2011/0140401 A1* | 6/2011 | Fischer | B60R 21/233 280/743.1 |
| 2013/0320656 A1* | 12/2013 | Yamada | B60R 21/2338 280/743.2 |
| 2015/0166002 A1* | 6/2015 | Fukawatase | B60R 21/233 280/730.1 |
| 2015/0307052 A1 | 10/2015 | Jaradi et al. | |
| 2015/0343986 A1* | 12/2015 | Schneider | B60R 21/205 280/729 |
| 2015/0367802 A1* | 12/2015 | Fukawatase | B60R 21/205 280/732 |
| 2016/0001733 A1* | 1/2016 | Kim | B60R 21/233 280/728.3 |
| 2016/0046254 A1* | 2/2016 | Yamada | B60R 21/233 280/729 |
| 2016/0046257 A1* | 2/2016 | Yamada | B60R 21/2338 280/729 |
| 2016/0059817 A1* | 3/2016 | Umehara | B60R 21/233 280/729 |
| 2016/0159311 A1* | 6/2016 | Yamada | B60R 21/233 280/729 |
| 2016/0207490 A1* | 7/2016 | Yamada | B60R 21/2338 |
| 2017/0036639 A1* | 2/2017 | Yamada | B60R 21/205 |
| 2017/0129439 A1* | 5/2017 | Taguchi | B60R 21/205 |
| 2017/0136981 A1* | 5/2017 | Fukawatase | B60R 21/233 |
| 2017/0158154 A1* | 6/2017 | Kobayashi | B60R 21/01332 |
| 2017/0217397 A1* | 8/2017 | Sumiya | B60R 21/233 |
| 2017/0355344 A1* | 12/2017 | Choi | B60R 21/231 |
| 2017/0355346 A1* | 12/2017 | Kobayashi | B60R 21/0136 |
| 2018/0015902 A1* | 1/2018 | Maenishi | B60R 21/205 |
| 2018/0029557 A1* | 2/2018 | Yamada | B60R 21/2338 |
| 2018/0056922 A1* | 3/2018 | Yamada | B60R 21/205 |
| 2018/0065581 A1* | 3/2018 | Ohno | B60R 21/01558 |
| 2018/0065583 A1* | 3/2018 | Tabushi | B60R 21/233 |
| 2018/0065587 A1* | 3/2018 | Maenishi | B60R 21/205 |
| 2018/0111583 A1* | 4/2018 | Jaradi | B60R 21/231 |
| 2018/0154856 A1* | 6/2018 | Yamada | B60R 21/231 |
| 2018/0154857 A1* | 6/2018 | Yamada | B60R 21/231 |
| 2018/0162312 A1* | 6/2018 | Faruque | B60R 21/239 |
| 2018/0208143 A1* | 7/2018 | Fischer | B60R 21/205 |
| 2018/0345901 A1* | 12/2018 | Yamada | B60R 21/2338 |
| 2018/0354450 A1* | 12/2018 | Yamada | B60R 21/23138 |

* cited by examiner

Sectional View at A-A

AIRBAG DEVICE FOR A FRONT PASSENGER SEAT

CROSS REFERENCE TO RELATED APPLICATIONS

The Present application claims priority from Japanese Patent Application No. 2016-142667 of Yamada, filed on Jul. 20, 2016, the entire disclosure of which is incorporated herein by reference.

BACKGROUND OF THE INVENTION

1. Field of the Invention

The present invention relates to an airbag device for a front passenger seat adapted to be mounted on an instrument panel of a vehicle in front of the front passenger seat. More particularly, the invention relates to an airbag device for a front passenger seat including an airbag which is housed in a housing in a folded-up configuration and deployable rearward for protecting a passenger when fed with an inflation gas.

2. Description of Related Art

JP 2016-20116 A discloses a known airbag device for a front passenger seat whose airbag includes a main inflatable section which is deployable towards a front passenger seat and a center bag section which is deployable on an inboard side of the main inflatable section in such a manner as to protrude farther rearward than the main inflatable section, and a tension cloth which connects the rear end of the center bag section and the main inflatable section. This known airbag device is designed to deploy the tension cloth at a slant with respect to a front and rear direction, as viewed from above or below the airbag as deployed, between the center bag section and main inflatable section, for catching the head of a passenger which moves diagonally forward in an inboard direction in the event of an oblique collision or an offset collision.

However, since the tension cloth is tense in a direction to cross the moving direction of the head at airbag deployment, the passenger's head will bump a flat surface of the tension cloth. Therefore, there is a room for improvement in catching the head more softly.

SUMMARY OF THE INVENTION

An object of the present invention is to provide an airbag device for a front passenger seat capable of protecting a passenger with an airbag smoothly when he moves diagonally forward.

The object of the invention will be achieved by a following airbag device for a front passenger seat:

The airbag device for a front passenger seat is adapted to be mounted on an instrument panel of a vehicle in front of a front passenger seat, and includes a housing adapted to be disposed in the instrument panel and an airbag housed in the housing in a folded-up configuration and being inflatable with an inflation gas for rearward deployment. The airbag includes:

a main inflatable section deployable rearward out of the housing and comprising a rear plane that forms a front-collision arresting face for protecting a head of a passenger in the event of a frontal collision of the vehicle;

an auxiliary inflatable section that is deployable on a left or right side of the main inflatable section;

a protruding inflatable section that is deployable at the rear of the auxiliary inflatable section in such a manner as to protrude further rearward than the main inflatable section, the protruding inflatable section comprising a near-side wall that rises rearward out of the front-collision arresting face and faces towards the front-collision arresting face at airbag deployment and a far-side wall that is opposed to the near-side wall at airbag deployment, the near-side wall forming an oblique-collision arresting face for protecting the head of the passenger as he moves diagonally forward in the event of an oblique collision or an offset collision of the vehicle;

an arresting recess that is formed between the front-collision arresting face and the oblique-collision arresting face in such a manner as to be recessed forward for receiving and arresting the head of the passenger;

a recess-pulling tether that joints, in an interior of the airbag, a leading end of the arresting recess and a front end portion of the airbag as deployed in order to deploy the arresting recess generally along a moving direction of the head of the passenger moving diagonally forward;

a regulating tether that prevents a rear end portion of the protruding inflatable section from drawing away from the main inflatable section when the head of the passenger is caught in the arresting recess at airbag deployment, the regulating tether extending from the leading end of the arresting recess towards the far-side wall of the protruding inflatable section and jointing the leading end of the arresting recess and the far-side wall of the protruding inflatable section, wherein a position of a joint of the regulating tether to the far-side wall is such a position that would produce a pulling force which pulls the protruding inflatable section towards a rear portion of the main inflatable section when the arresting recess catches the head of the passenger and the leading end of the arresting recess moves forward.

In the airbag device of the invention, the airbag includes, between the front-collision arresting face and oblique-collision arresting face which rises rearward out of the front-collision arresting face, the arresting recess which is recessed forward for receiving and arresting the passenger's head. Accordingly, in the event of an oblique collision or offset collision of the vehicle, the airbag is able to arrest the passenger's head by guiding the head by the oblique-collision arresting face into the arresting recess as he moves diagonally forward. At this time, at least a part of the passenger's head will thrust itself into the arresting recess while opening the recess toward the left and right, such that the head will be caught by a large arresting area composed of inner surfaces of the arresting recess, and a kinetic energy of the head will be absorbed as it goes into the arresting recess. Accordingly, the arresting recess will cushion the front, left and right sides of the head softly with the inner surfaces. At a frontal collision of the vehicle, the airbag device of the invention will catch the passenger's head with the front-collision arresting face.

Moreover, the airbag of the airbag device of the invention internally includes the recess-pulling tether which connects the leading end of the arresting recess and the front end portion of the airbag as deployed. The recess-pulling tether will help keep the arresting recess recessed adequately and prevent the arresting recess from moving or oscillating in a front and rear direction at airbag deployment, thus the arresting recess will be deployed in place quickly. Further, since the recess-pulling tether helps deploy the arresting recess generally along the moving direction of the head of the passenger moving diagonally forward, the passenger's head will go into the arresting recess generally along the direction that the arresting recess is recessed. That is, the recess-pulling tether will help prevent only either one of the inner surfaces of the arresting recess from being engaged with the passenger's head and enable the arresting recess to catch the head in a balanced fashion with the inner surfaces. As a consequence, the arresting recess will catch the head of the passenger without turning the head in a left and right direction.

The airbag of the airbag device of the invention further includes internally the regulating tether which connects the leading end of the arresting recess and the far-side wall of the protruding inflatable section, which is opposed to the oblique-collision arresting face, and the position of the joint of the regulating tether to the far-side wall is such a position that would produce a pulling force which pulls the protruding inflatable section towards the rear portion of the main inflatable section when the arresting recess catches the passenger's head and the leading end of the arresting recess moves forward. With this configuration, when the arresting recess catches the passenger's head and the leading end of the arresting recess moves forward along with the movement of the head, the regulating tether will pull the rear end portion of the protruding inflatable section towards the rear portion of the main inflatable section. That is, although the passenger's head may push the protruding inflatable section towards a direction away from the main inflatable section when guided by the oblique-collision arresting face and going into the arresting recess, the regulating tether will hold the rear end portion of the protruding inflatable section from drawing or moving away from the main inflatable section, such that the arresting recess will adequately catch and protect the head of the passenger.

Therefore, the airbag device for a front passenger seat of the invention is capable of protecting a passenger with the airbag as he moves diagonally forward.

Specifically, the position of the joint of the regulating tether to the far-side wall is desirably located, in a view from above or below the airbag as fully inflated, at a position further rearward than an intersection point of the far-side wall and a straight line which is drawn from the leading end of the arresting recess generally orthogonally to a line connecting an opening and the leading end of the arresting recess. When the head of the passenger goes into the arresting recess and the leading end of the arresting recess moves forward, the other end of the regulating tether, as it is jointed to the leading end of the arresting recess, will also move forward together with the leading end of the arresting recess. With the above configuration, since the length of the regulating tether does not change when it is tense, the end of the regulating tether jointed to the far-side wall will rotate or swing about the other end and move towards the rear portion of the main inflatable section. Thus the rear end portion of the protruding inflatable section will smoothly swing towards the rear portion of the main inflatable section.

Alternatively, the position of the joint of the regulating tether to the far-side wall may be located further rearward than the opening of the arresting recess in a view from above or below the airbag as fully inflated. With this configuration, the joint position to the far-side wall located further rearward than the arresting recess will be more surely pulled or swing at the rear of the arresting recess when the passenger's head is caught by the arresting recess, thus the rear end portion of the protruding inflatable section will smoothly swing towards the rear portion of the main inflatable section with the aid of the regulating tether.

In the airbag device for a front passenger seat of the invention, the airbag desirably further includes a second regulating tether that is deployable generally symmetrically with the regulating tether with respect to the recess-pulling tether and that extends from the leading end of the arresting recess towards the main inflatable section and is jointed to a portion of the main inflatable section by the terminal. Such a second regulating tether will prevent the joint region of the regulating tether to the leading end of the arresting recess from shifting towards the far-side wall due to a pressure of the passenger's head when the head goes into the arresting recess and the leading end of the arresting recess moves forward. Thus the regulating tether, in cooperation with the second regulating tether, will prevent the rear end portion of the protruding inflatable section from moving away from the main inflatable section in a more adequate fashion when the airbag catches the passenger's head.

In the above instance, it is desired that the airbag further internally includes a front-rear tether that connects a generally center in a left and right direction of the front-collision arresting face and a front end portion of the main inflatable section and is deployable generally along a front and rear direction for preventing the front-collision arresting face from moving rearward at airbag deployment, and that the terminal of the second regulating tether is jointed to the front-rear tether. The front-rear tether will prevent the front-collision arresting face from being deployed unduly rearward in an initial stage of airbag deployment. In addition, in cooperation with the recess-pulling tether disposed inside the protruding inflatable section, the front-rear tether will suppress an undue oscillation in a front and rear direction of the whole airbag at deployment and help inflate the airbag quickly into a contour at full inflation. Further, in comparison with an instance where the terminal of the second regulating tether is jointed to an outer circumferential wall of the main inflatable section, the configuration that the second regulating tether is jointed to the front-rear tether will suppress the second regulating tether from oscillating in a left and right direction at airbag deployment, and help steady the deployment of the arresting recess quickly.

Furthermore, in the airbag device for a front passenger seat of the invention, it is desired that the auxiliary inflatable section is disposed on a side of the main inflatable section deployable towards a center in a width direction of the vehicle, and that the auxiliary inflatable section includes, at the region deployable towards the instrument panel, a supporting inflatable section that supports a front side of the protruding inflatable section. The supporting inflatable section desirably includes a circumventing recess that is configured to circumvent an object which protrudes upward out of the instrument panel.

With this configuration, when mounted on a vehicle equipped with the object protruding out of the instrument panel, the airbag will be smoothly deployed without being engaged with the object. Further, with the supporting inflatable section and the regulating tether, when the arresting recess catches the passenger's head, although the circumventing recess is located forward of the protruding inflatable section, the front portion of the protruding inflatable section will be adequately supported by the supporting inflatable section and the rear end portion of the protruding inflatable section will be prevented from drawing away from the main inflatable section. Accordingly, the passenger's head will be caught by the arresting recess in a steady fashion.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
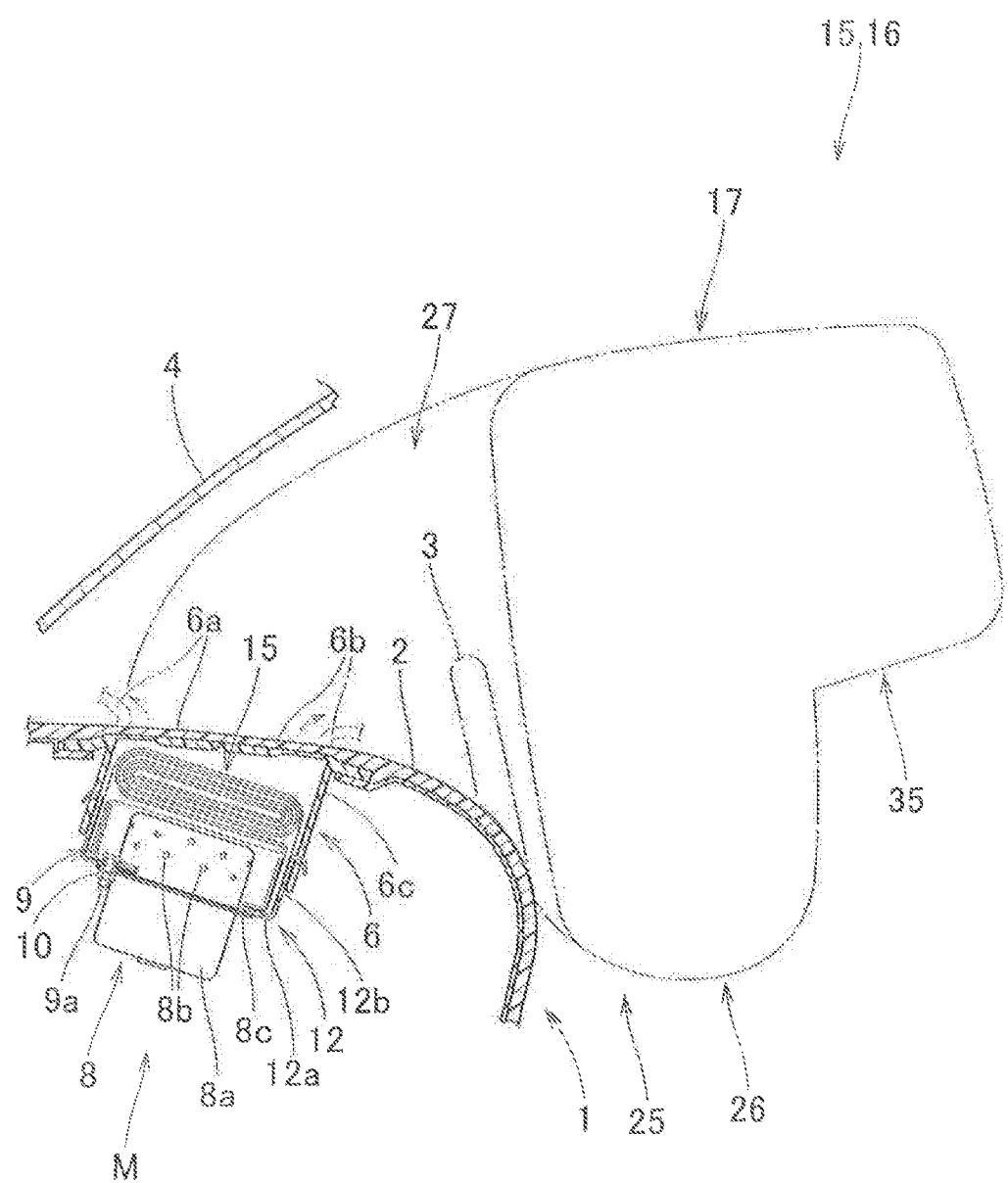
FIG. 1 is a schematic vertical section of an airbag device for a front passenger seat embodying the invention as mounted on a vehicle.
Figure 2:
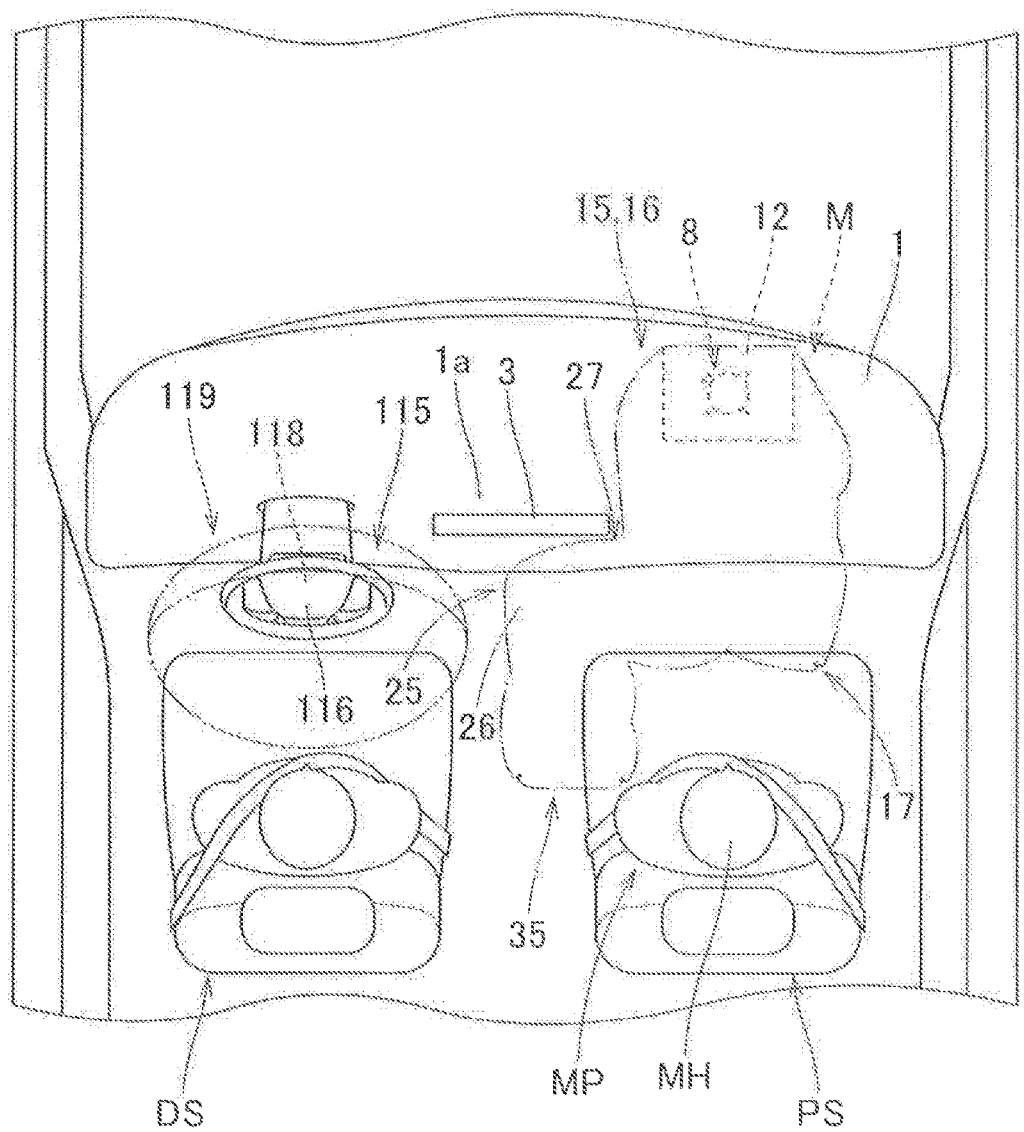
FIG. 2 is a schematic plan view of the airbag device of FIG. 1 as mounted on the vehicle.

FIGS. 1 and 2 depict an airbag device M for a front passenger seat embodying the invention as mounted on a vehicle V. The airbag device M is a top-mount airbag device stored inside a top plane 2 of an instrument panel or dashboard 1 in front of a front passenger seat PS of the vehicle V. The vehicle V is equipped with a car navigation system. A monitor 3 of the car navigation system is disposed in a vicinity of the rear end of a central region 1a of the dashboard 1 in such a manner as to protrude upward partially out of the dashboard 1. Specifically, the monitor 3 is located on the left side of a case (housing) 12 of the airbag device M (in a vicinity of the center in a width direction of the vehicle V, in front of a region between the driver's seat DS and front passenger seat PS). Unless otherwise specified, front-rear, up-down and left-right directions in this specification are intended to refer to front-rear, up-down and left-right directions of the vehicle V.

As shown in FIG. 1, the airbag device M includes an airbag 15, which is folded up, an inflator 8 for supplying the airbag 15 with an inflation gas, a case or housing 12 for housing and holding the airbag 15 and inflator 8, a retainer 9 for mounting the airbag 15 and inflator 8 on the case 12 and an airbag cover 6 for covering the airbag 15.

The airbag cover 6 is integral with the dashboard 1 made from synthetic resin and includes two doors, i.e. front and rear doors 6a and 6b, which are designed to open when pushed by the airbag 15 upon airbag deployment. The airbag cover 6 further includes, around the doors 6a and 6b, a joint wall 6c which is coupled to the case 12.

As shown in FIG. 1, the inflator 8 includes a main body 8a which is formed into a generally pot-like shape and provided with a plurality of gas discharge ports 8b, and a flange 8c for attachment to the case 12. The inflator 8 of this specific embodiment is designed to be actuated in the event of a frontal collision, an oblique collision or an offset collision of the vehicle V.

As shown in FIG. 1, the case or housing 12 is made of sheet metal into a generally rectangular parallelepiped with a rectangular opening at the top, and includes a generally rectangular bottom wall 12a which the inflator 8 is inserted into and mounted on from below and a circumferential wall 12b which extends upward from the outer edge of the bottom wall 12a and retains the joint wall 6c of the airbag cover 6. The airbag 15 and inflator 8 are attached to the bottom wall 12a of the case 12 by locating the retainer 9 inside the airbag 15 such that bolts (fixing means) 9a of the retainer 9 go through the periphery of a later-described gas inlet port 21 of the airbag 15, the bottom wall 12a of the case 12 and flange 8c of the inflator 8 and by fastening the bolts 9a with nuts 10. Further, unillustrated brackets are provided on the bottom wall 12a for mounting on a vehicle body structure.

Referring to FIGS. 3 to 13, the airbag 15 includes a bag body 16 inflatable with an inflation gas, and tethers 50, 54, 55, 57, 61, 62, 65, 69, 70, 72 and 74 which are disposed inside the bag body 16 for controlling the contour of the bag body 16 as fully inflated.

The bag body 16 is fabricated of a sheet material having flexibility. As shown in FIGS. 3 to 7, the bag body 16 includes a main inflatable section 17, an auxiliary inflatable section which is deployable on the left side of the main inflatable section 17, and a protruding inflatable section 35 which is deployable on the rear side of the auxiliary inflatable section in such a manner as to protrude farther rearward than the main inflatable section 17. In the illustrated embodiment, the auxiliary bag section is composed of a later-described left region 25 which is integral with the main inflatable section 17 and is disposed on the left side of the main inflatable section 17.

The main inflatable section 17 is designed to be so deployed as to fill up a space between the top plane 2 of the dashboard 1 and the windshield 4, as indicated with double-dotted lines in FIG. 1. More specifically, as shown in FIGS. 3 to 6, the outer contour of the main inflatable section 17 as fully inflated is a generally triangular prism extending in a left and right direction. The main inflatable section 17 includes a mounting region 20 at the right front end region as deployed, at which mounting region 20 the main inflatable section 17 is mounted on the case 12. That is, the main inflatable section 17 is designed to protrude considerably towards the left (i.e. towards the driver's seat DS or towards the center in a width direction of the vehicle V) at airbag deployment. The main inflatable section 17 includes a rear side wall 29 deployable at the rear to face a front seat passenger MP and a circumferential wall 18 which extends forward from a peripheral edge of the rear side wall 29 while narrowing forward in dimension in an up and down direction.

Figure 3:
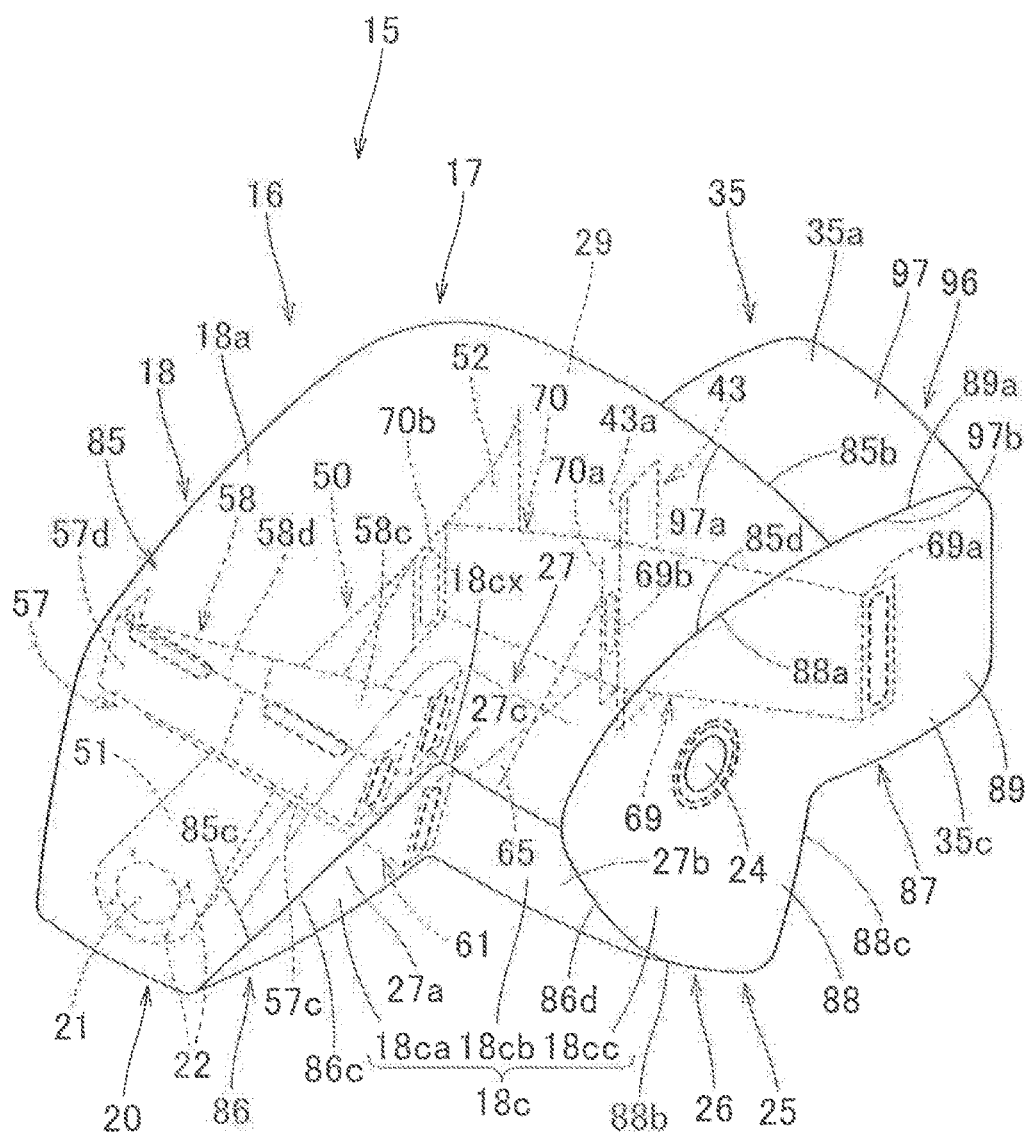
FIG. 3 is a perspective view of an airbag for use in the airbag device of FIG. 1 as inflated by itself, viewed from left front direction.
Figure 11:
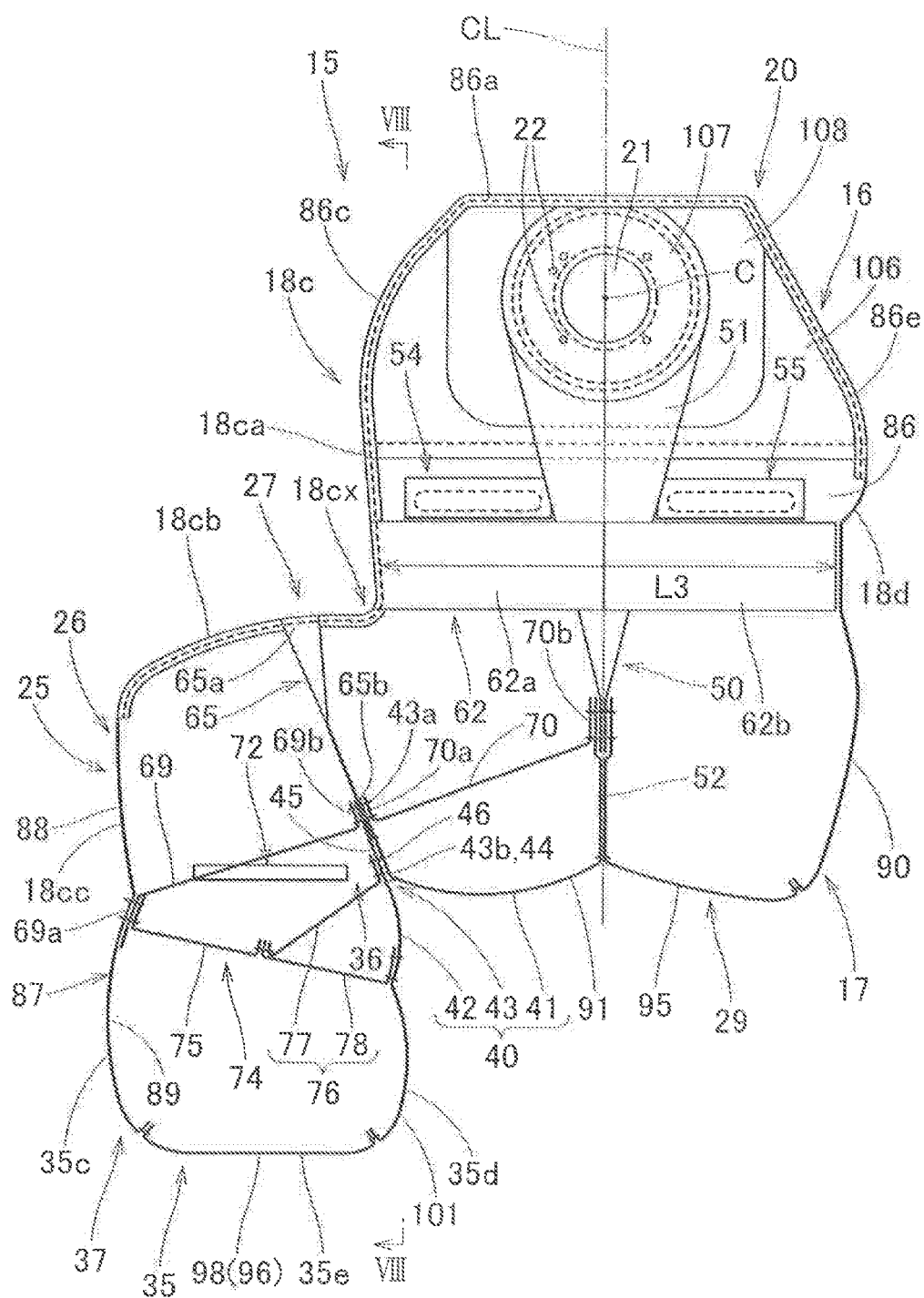
FIG. 11 is a schematic horizontal sectional view of the airbag of FIG. 3.

The circumferential wall 18 is a portion deployable mainly in such a manner as to fill up the space between the top plane 2 of the dashboard 1 and the windshield 4, and includes an upper wall 18a and a lower wall 18b deployable in such a manner as to extend generally along a left and right direction and be opposed to each other, and a left side wall 18c and a right side wall 18d deployable in an opposing fashion. The right side wall 18d is deployable generally along a front and rear direction. The left side wall 18c constitutes the left side of the left region 25. As shown in FIGS. 3 and 11, the left side wall 18c includes a front region 18ca which extends generally along a front and rear direction at the front end, a rear region 18cc which extends generally along a front and rear direction at a further leftward position than the front region 18ca at the rear end, and an intermediate region 18cb which extends generally along a left and right direction and an up and down direction in such a manner as to connect the front region 18ca and rear region 18cc.

Figure 4:
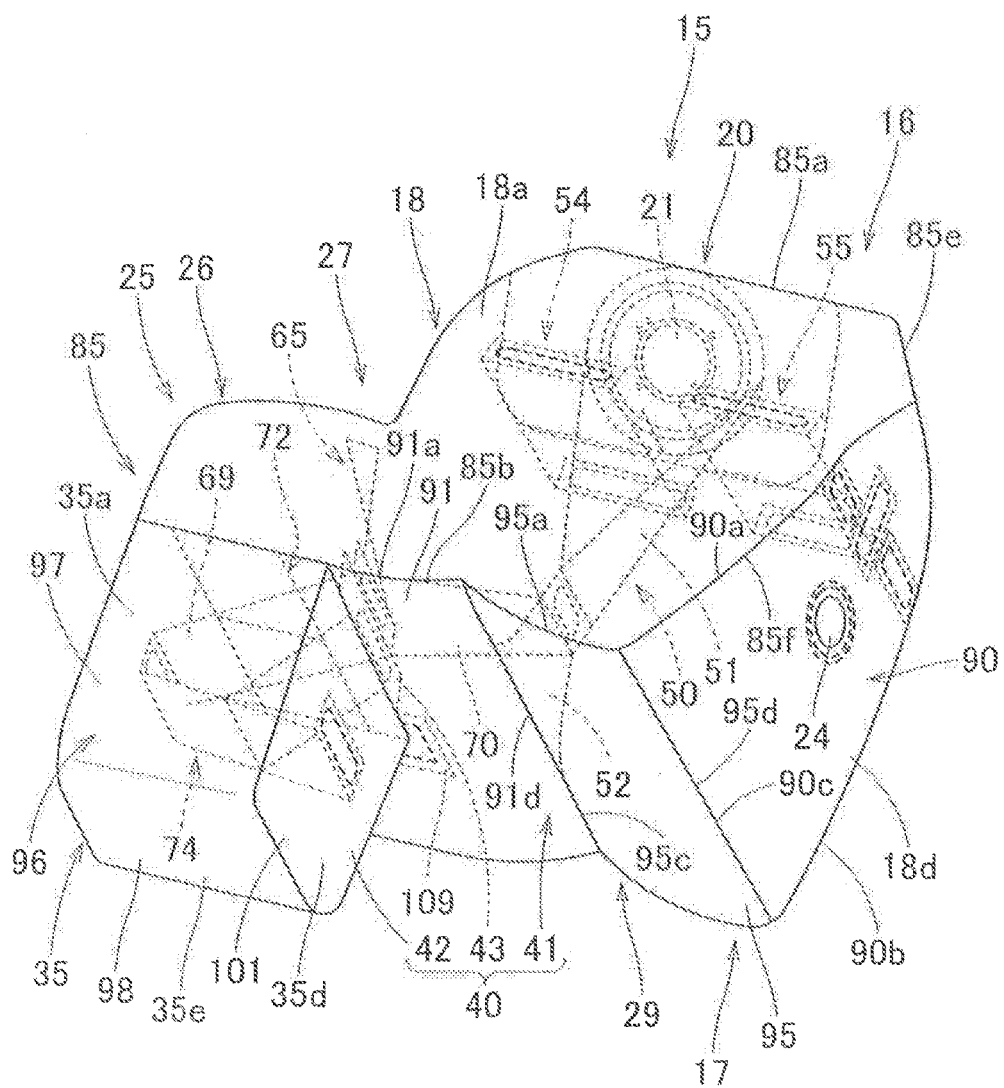
FIG. 4 is a perspective view of the airbag of FIG. 3 as inflated by itself, viewed from right rear above.
Figure 16:
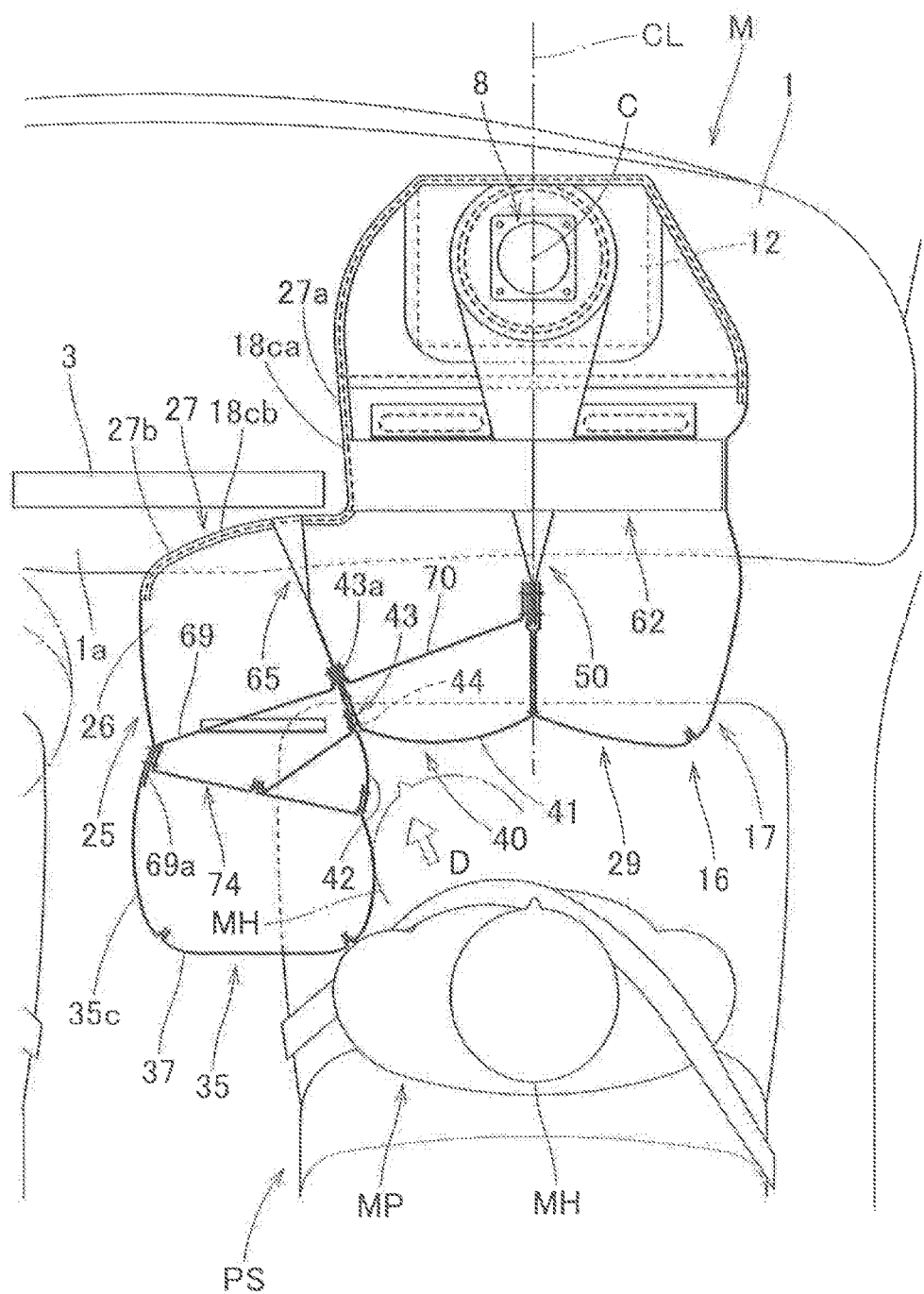
FIG. 16 is a schematic horizontal sectional view of the airbag device of the embodiment as the airbag is completely deployed.

In the airbag 15 of the illustrated embodiment, the right front end region of the circumferential wall 18 at airbag deployment serves as a mounting region 20 at which the airbag 15 is mounted on the case 12 (FIGS. 3, 4 and 11). The mounting region 20 is designed to stay inside the case 12 at airbag deployment. The mounting region 20 is provided, at its lower portion (i.e. on the lower wall 18b), with a generally round gas inlet port 21 for introducing an inflation gas. In the periphery of the gas inlet port 21 are a plurality of (four, in the illustrated embodiment) mounting holes 22 for receiving the bolts 9a of the retainer 9 which secure the periphery of the gas inlet port 21 to the bottom wall 12a of the case 12. In the illustrated embodiment, the main bag section 17 of the airbag 15 is secured to the case 12 and mounted on the vehicle V such that the center (FIG. 11) of the gas inlet port 21 coincides with the center in a left and right direction of the front passenger seat PS, as shown in FIG. 16. The center of the gas inlet port 21 will be called hereinafter a mounting center C, and a line which runs through the mounting center C in a front and rear direction will be called hereinafter a center line CL. As shown in FIGS. 3 to 6, each of the left side wall 18c and right side wall 18d of the circumferential wall 18 is provided with a vent hole 24 for releasing an extra inflation gas. The vent hole 24 of the left side wall 18c is disposed on the rear region 18cc which constitutes a later-described supporting inflatable section 26, as shown in FIG. 3.

As shown in FIG. 11, the main inflatable section 17 of the illustrated embodiment is so designed as to protrude farther leftward (i.e. towards the center in the width direction of the vehicle V or towards the driver's seat DS) than rightward (i.e. towards an outboard direction). More particularly, a leftward protruding amount of the region disposed on the left side of the center line CL (i.e. the supporting inflatable section 26) at airbag deployment is greater than a rightward protruding amount of the region disposed on the right side of the center line CL. As described above, the left region 25 of the main inflatable section 17 protruding considerably leftward constitutes the auxiliary inflatable section. As shown in FIGS. 3, 4 and 11, in order to circumvent the above-described monitor 3 of the car navigation system when deployed, the main inflatable section 17 of the illustrated embodiment is configured to be recessed at the left front portion (at the front end of the left region 25). That is, in the bag body 16 of the illustrated embodiment, the left region 25 as the auxiliary inflatable section includes a supporting inflatable section 26 which is disposed in front of the protruding inflatable section 35 and supports the front side of the protruding inflatable section 35, and the recessed portion which is disposed at the front end of the supporting inflatable section 26 for circumventing the monitor 3 (i.e. an object which protrudes upward out of the dashboard 1) constitutes a circumventing recess 27. As shown in FIG. 3, the circumventing recess 27 is formed over an entire area in an up and down direction of the left region 25 (i.e. the auxiliary inflatable section).

In the illustrated embodiment, as shown in FIGS. 3 and 11, the right side face 27a of the circumventing recess 27 (i.e. the front region 18ca of the left side wall 18c) is generally orthogonal to the rear side face 27b of the circumventing recess 27 (i.e. the intermediate region 18cb of the left side wall 18c) at airbag deployment. Thus the circumventing recess 27 is provided with a corner region 27c between the right side face 27a and rear side face 27b (in other words, an intersecting region 18cx of the front region 18ca and intermediate region 18cb). Further, as shown in FIG. 16, the left region 25 is designed to be deployed such that the left side wall 18c (specifically, the rear region 18cc or the left wall of the supporting inflatable section 26) is disposed in proximity to an airbag 119 deployed over the steering wheel 115. Moreover, as shown in FIGS. 11 and 16, the airbag 15 is designed such that the front region 18ca of the left side wall 18c (i.e. the right side face 27a of the circumventing recess 27) is located generally at the same position in a left and right direction as the later-described right wall 35d of the protruding inflatable section 35 at airbag deployment.

Figure 9:
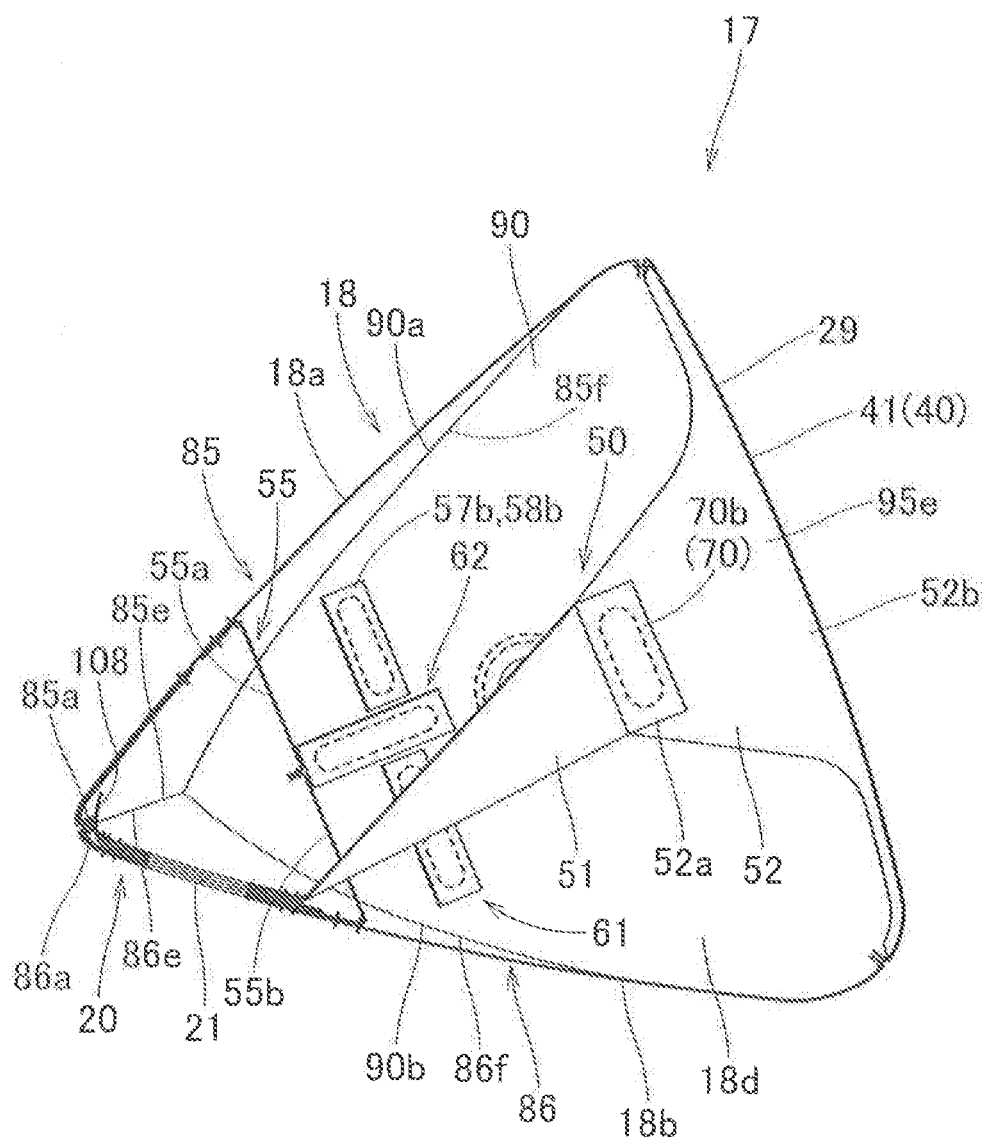
FIG. 9 is a schematic vertical section of the airbag of FIG. 3 taken at the location of a front-rear tether.

The rear side wall 29 of the main inflatable section 17 is deployable generally vertically at the rear to face the front passenger seat PS. The rear side wall 29 of the illustrated embodiment is deployable slightly at a slant relative to an up and down direction such that the lower end protrudes farther rearward than the upper end as shown in FIG. 9. In a horizontal sectional view of the airbag 15 as deployed, the rear side wall 29 extends generally along a left and right direction, as shown in FIG. 16. As shown in FIG. 11, the protruding inflatable section 35 is located in an area on the left side of the center in a left and right direction of the rear side wall 29 (i.e. on the left side of the center line CL) and at the rear of the left region 25 (i.e. the auxiliary inflatable section). More specifically, the protruding inflatable section 35 is formed at a left upper area of the rear side wall 29 (i.e. at an upper area of the left region 25) as deployed. The protruding inflatable section 35 is thus deployable at an obliquely left front position of the head MH of the passenger MP sitting in the front passenger seat PS, as shown in FIG.

16. The airbag 15 of the illustrated embodiment is designed such that the protruding inflatable section 35 is deployable at the rear of the monitor 3 of the car navigation system. That is, at airbag deployment, the supporting inflatable section 26 and the protruding inflatable section 35 line up in a front and rear direction at the rear of the monitor 3, as shown in FIG. 16.

The protruding inflatable section 35 is designed to be deployed in such a manner as to protrude farther rearward than the main inflatable section 17. A communication region 36 is provided at the front end of the protruding inflatable section 35, i.e. between the protruding inflatable section 35 and the supporting inflatable section 26 of the left region 25 (i.e. the auxiliary inflatable section). Thus the protruding inflatable section 35 is fed with an inflation gas from the left region 25 (i.e. the main inflatable section 17) via the communication region 36. The protruding inflatable section 35 includes an upper wall 35a and a lower wall 35b extending generally along a left and right direction on the upper and lower sides, a left side wall 35c and a right side wall 35d extending generally along a front and rear direction at the left and right sides, and a rear side wall 35e extending generally along an up and down direction at the rear. In the illustrated embodiment, the left side wall 35c is continuous with the left side wall 18c of the circumferential wall 18 of the main inflatable section 17 (specifically, with the rear region 18cc forming the left wall of the supporting inflatable section 26), as shown in FIG. 11.

As shown in FIG. 11, in a horizontal sectional view of the airbag 15 as deployed, the protruding inflatable section 35 is formed at an area of the airbag 15 on the left side of the center line CL which runs through the mounting center C in a front and rear direction (in other words, at an area disposed towards the center of the width direction of the vehicle V, towards the driver's seat DS). In the illustrated embodiment, the width in a left and right direction of the protruding inflatable section 35 as inflated is about two fifths of the width in a left and right direction of a region in a vicinity of the rear side wall 29 of the main inflatable section 17 as inflated. The width in an up and down direction of the protruding inflatable section 35 as inflated is such as to be capable of protecting the head MH of the passenger MP adequately when it moves diagonally forward in the event of an oblique collision or an offset collision. More particularly, the width L2 in an up and down direction of the protruding inflatable section 35 is greater than the width L1 (FIG. 8) in an up and down direction of a later-described arresting recess 43, and is about three fifths of the width in an up and down direction of a region in a vicinity of the rear side wall 29 of the main inflatable section 17 as inflated. In the illustrated embodiment, furthermore, as indicated by double-dotted lines in FIG. 2, the protruding inflatable section 35 is designed to protrude farther rearward than the airbag 119 for the steering wheel 115 as deployed at airbag deployment.

In the airbag 15 of the illustrated embodiment, the protruding inflatable section 35 and the rear side wall 29 of the main inflatable section 17 constitute a passenger protection region 40 which protects the passenger MP at airbag deployment. The passenger protection region 40 includes a front-collision arresting face 41 which protects the head MH of the passenger MP when it moves forward in the event of a frontal collision of the vehicle V, and an oblique-collision arresting face 42 which protects the head MH of the passenger MP when it moves diagonally forward in the event of an oblique collision or an offset collision of the vehicle V. There is formed an arresting recess 43 between the front-collision arresting face 41 and the oblique-collision arresting face 42 for receiving and arresting the head MH of the passenger MP.

In the illustrated embodiment, the front-collision arresting face 41 is composed of an upper area of the rear side wall 29, the rear surface of the main inflatable section 17 as deployed. In other words, the front-collision arresting face 41 is composed of an area disposed on the right side of the protruding inflatable section 35 as deployed. That is, the front-collision arresting face 41 includes an area extending farther to the left of the center line CL (towards the driver's seat DS) so as to protect the head MH of the passenger MP smoothly when it moves forward in the event of a frontal collision. As shown in FIG. 11, in the horizontal sectional view of the airbag 15 as deployed, the front-collision arresting face 41 is slightly sunken forward on the center line CL or in a vicinity of the center in a left and right direction.

The oblique-collision arresting face 42 is composed of the right side wall 35d of the protruding inflatable section 35 which is continuous with and rises rearward out of the rear side wall 29 of the main inflatable section 17. The oblique-collision arresting face 42 of the illustrated embodiment is designed to extend generally along a front and rear direction at airbag deployment. The lower region of the rear side wall 29 of the airbag 15 is to catch mainly the thorax of the passenger MP when the passenger protection region 40 arrests the head MH of the passenger MP.

Figure 8:
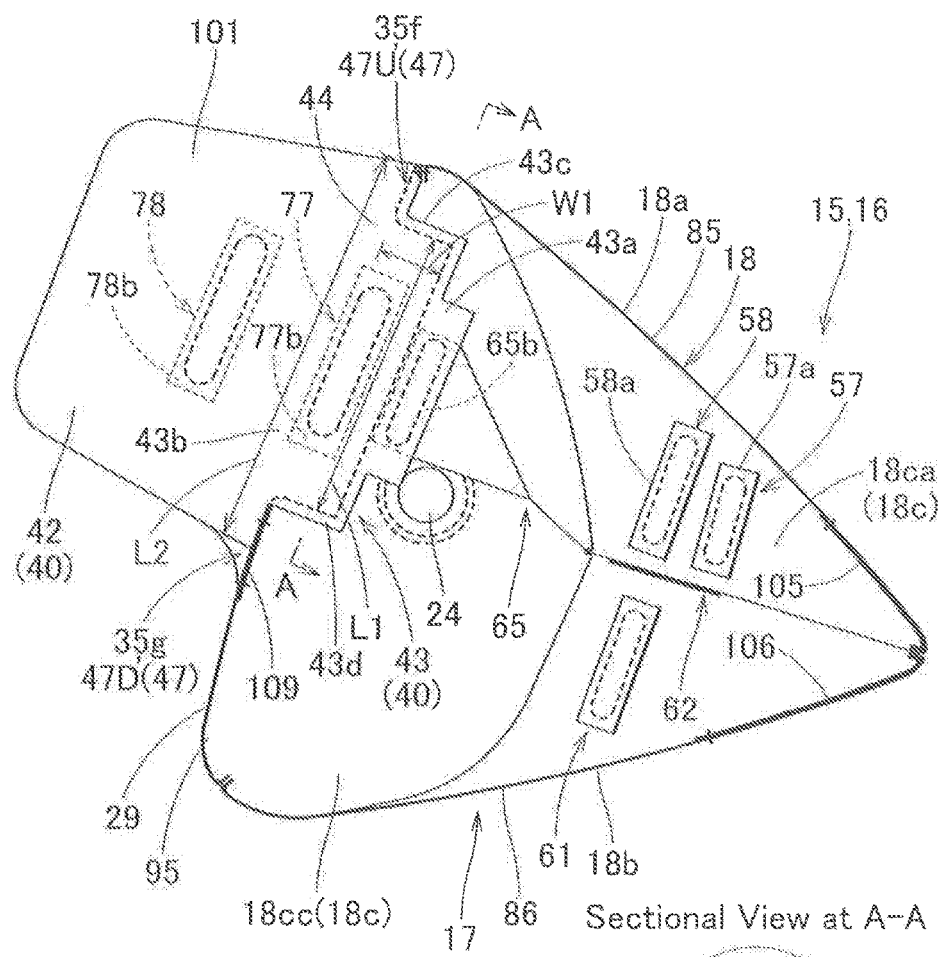
FIG. 8 is a schematic vertical section of the airbag of FIG. 3 taken along line VIII-VIII of FIG. 11.
Figure 8:
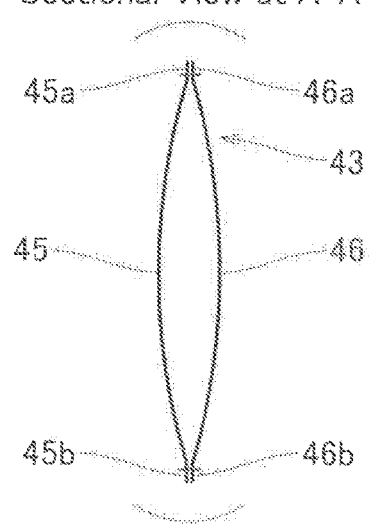
Figure 13:
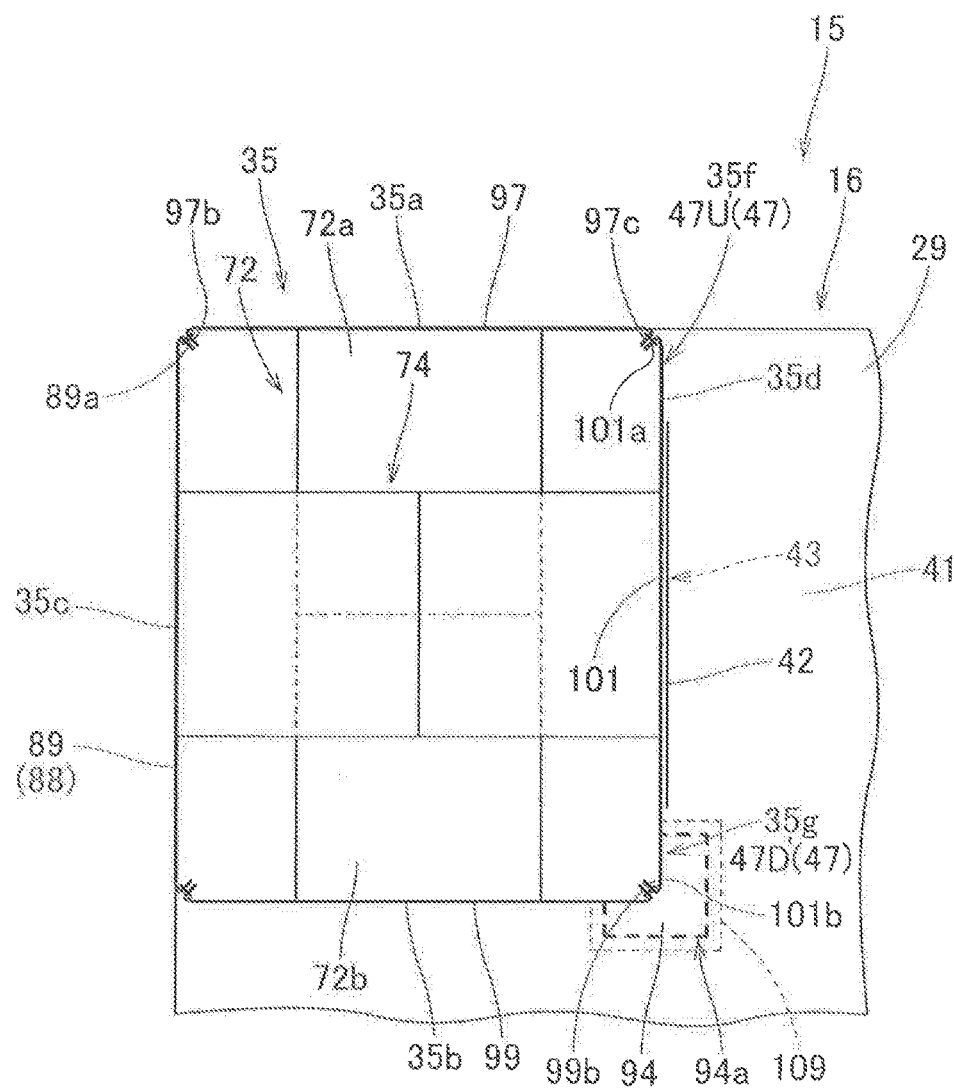
FIG. 13 is a sectional view taken along line XIII-XIII of FIG. 10.

The arresting recess 43 formed between the front-collision arresting face 41 and oblique-collision arresting face 42 is provided for receiving and arresting the head MH of the passenger MP. In the illustrated embodiment, as shown in FIG. 11, the arresting recess 43 is formed generally along an up and down direction at the boundary of the right area of the protruding inflatable section 35 and the rear side wall 29 of the main inflatable section 17, in such a manner as to be sunken or recessed forward like a pocket such that the rear end 43b is open, as shown in FIG. 8. In other words, the arresting recess 43 is closed at the upper and lower ends. More specifically, the arresting recess 43 is composed of a left side wall 45 and a right side wall 46 each of which has a generally rectangular contour extending in an up and down direction when viewed from a left and right direction. The arresting recess 43 is formed by joining (sewing) together upper edges 45a and 46a, lower edges 45b and 46b and front edges 45c and 46c of the left side wall 45 and right side wall 46, thus having a pocket-like shape opening at the rear end 43b, as shown in FIG. 8. That is, the arresting recess 43 has a generally uniform width in an up and down direction from the rear end 43b to the front end (leading end) 43a. The arresting recess 43 has such a width L1 in an up and down direction at the rear end 43b (at the opening 44) as to admit the passenger's head MH smoothly. More specifically, the width L1 in an up and down direction of the rear end 43b (the opening 44) of the arresting recess 43 is about 400 mm, which is smaller than the width L2 (FIG. 8) in an up and down direction of the front end region (or root region) of the protruding inflatable section 35. The dimension in a front and rear direction (depth) W1 (FIG. 8) of the arresting recess 43 is such as to accommodate a front region of the passenger's head MH and let the leading end (i.e. the front end 43a) of the recess 43 be movable forward along a forward movement of the passenger's head MH when having caught the head MH. The dimension W1 of the illustrated embodiment is about 60 to 100 mm. The arresting recess 43 is so formed that the center in an up and down direction generally coincides with that of the protruding inflatable section 35. In other words, as shown in FIGS. 8 and 13, the protruding inflatable section 35 includes, adjacent the upper edge 43c and the lower edge 43d of the arresting recess 43, a peripheral region 35f and a peripheral region 35g which protrude outwardly in an up and down direction and are not recessed. Each of the peripheral regions 35f and 35g of the protruding inflatable section 35 is jointed to the rear side wall 29 of the main inflatable section 17 at each of the upper side and lower side of the arresting recess 43. Each of the peripheral regions 35f and 35g serves as a joint region 47U/47D that is formed in a vicinity of the upper end 43c/lower end 43d of the arresting recess 43 and joints the protruding inflatable section 35 and rear side wall 29 (i.e. the front-collision arresting face 41 and oblique-collision arresting face 42) together, as shown in FIGS. 8 and 13.

Figure 12:
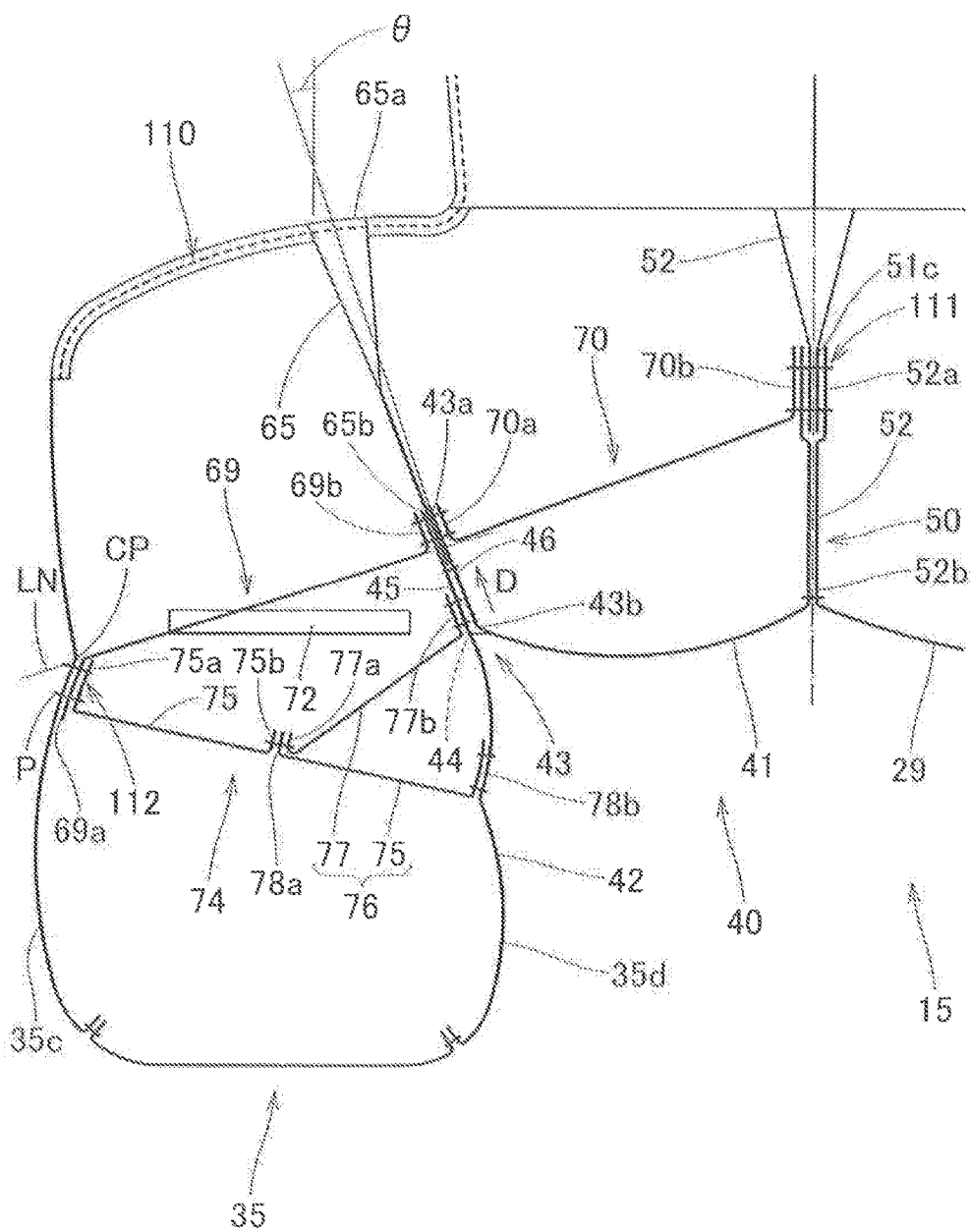
FIG. 12 is a schematic partial horizontal sectional view of the airbag of FIG. 3.

In the illustrated embodiment, the airbag 15 is internally provided with a recess-pulling tether 65 which helps deploy the arresting recess 43 generally along a moving direction D of the passenger's head MH which moves diagonally forward. Specifically, the recess-pulling tether 65 connects the leading end (the front end 43a) of the arresting recess 43 with the intermediate region 18cb of the left side wall 18c (i.e. rear side face 27b of the circumventing recess 27) inside the auxiliary inflatable section (i.e. the left region 25). More specifically, the recess-pulling tether 65 connects the leading end (the front end 43a) of the arresting recess 43 to the intermediate region 18cb of the left side wall 18c which constitutes the left region 25 (auxiliary inflatable section) of the main inflatable section 17 (in the illustrated embodiment, to a vicinity of the right end of the intermediate region 18cb proximate to the left end of a later-described left-right tether 62 which is jointed to the front region 18ca), as shown in FIGS. 11 and 12. In the illustrated embodiment, the recess-pulling tether 65 helps deploy the arresting recess 43 generally along the moving direction D (FIG. 16) of the passenger's head MH which moves diagonally forward, as shown in FIGS. 11 and 12. In the illustrated embodiment, as referred to FIG. 12, the inclination angle θ of the arresting recess 43 with respect to a front and rear direction (with respect to the center line CL passing through the mounting center C along a front and rear direction) is about 20 degree (about 15 to 25 degree) such that the arresting recess 43 is deployed generally along the moving direction D of the passenger's head MH which moves diagonally forward. As shown in FIG. 8, the recess-pulling tether 65 is jointed to a vicinity of the center in an up and down direction of the leading end (the front end 43a) of the arresting recess 43. At airbag deployment, the arresting recess 43 is deployed, pulled by the recess-pulling tether 65, in such a manner as to be continuous with and be sunken forward from the right side wall 35d of the protruding inflatable section 35, and such that the left side wall 45 and right side wall 46 are brought into contact with each other generally wholly and thus the rear end 43b (or the opening 44) is held from gaping open.

As shown in FIGS. 3 to 13, the bag body 16 internally includes tethers 50, 54, 55, 57, 58, 61, 62, 65, 69, 70, 72 and 74. Specifically, the bag body 16 includes a front-rear tether 50 which is disposed inside the main inflatable section 17, two vertical tethers 54 and 55 which are disposed inside the main inflatable section 17, four left-right tethers 57, 58, 61 and 62 which are disposed inside the main inflatable section 17, the recess-pulling tether 65 which is disposed inside the left region 25 (auxiliary inflatable section) of the main inflatable section 17 for pulling the arresting recess 43, as described above, a regulating tether 69 and an auxiliary (or second) regulating tether 70 which are disposed inside the main inflatable section 17 for limiting the movement of the protruding inflatable section 35 at catching the passenger's head MH, a vertical tether 72 which is disposed in a vicinity of the front end of the protruding inflatable section 35 (i.e. in a vicinity of the communication region 36) and a left-right tether 74 which is disposed inside the protruding inflatable section 35.

As shown in FIG. 11, the front-rear tether 50 is designed to be deployed on the center line CL which passes through the center (mounting center C) of the gas inlet port 21 and extends along a front and rear direction, and is formed by jointing a front section 51 extending from the periphery of the gas inlet port 21 and a rear section 52 extending from the rear side wall 29 (FIGS. 9 and 11).

Figure 14:
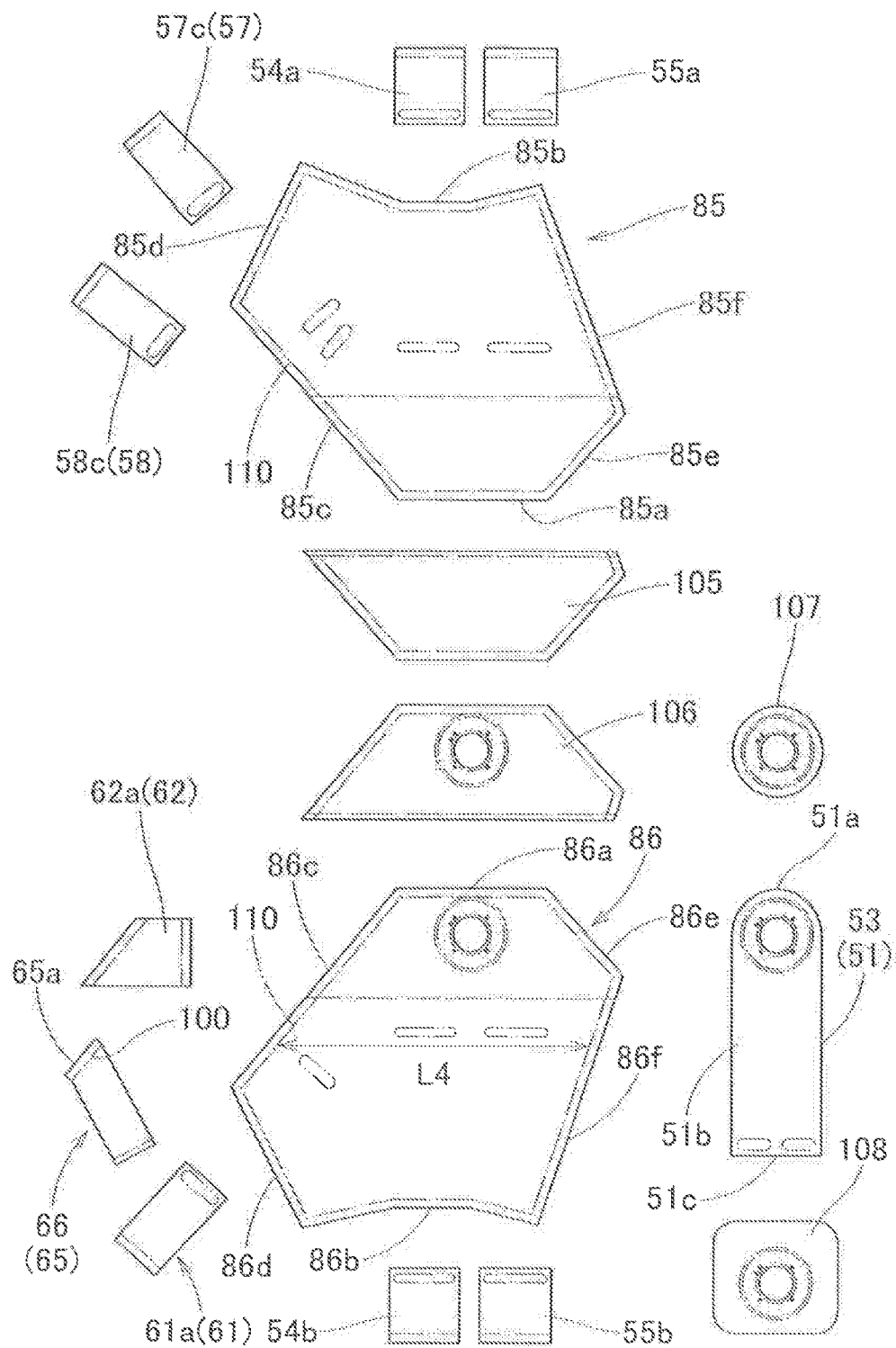
FIGS. 14 and 15 depict base cloths of the airbag of FIG. 3 by plan views.

The front section 51 is formed by folding a base material 53 shown in FIG. 14 into a bilaterally symmetric shape deployable in such a three dimensional shape approximate to a generally triangular pyramid that the front end extends generally in a left and right direction and the rear end extends generally in an up and down direction. As shown in FIGS. 9 and 11, in the illustrated embodiment, the front end region of the front section 51 serves as a joint region 51a to the bag body 16. The joint region 51a is provided with openings (reference numeral omitted) correspondent to the gas inlet port 21 and mounting holes 22 and is sewn to the periphery of the gas inlet port 21 at the lower portion of the mounting region 20 of the main inflatable section 17 by the entire periphery. The region of the front section 51 extending rearward from the gas inlet port 21 is a main region 51b which forms the three dimensional shape approximate to a generally triangular pyramid (FIGS. 9 and 11). The main region 51b is sewn to the front end 52a of the rear section 52 by the rear end 51c, and a dimension in an up and down direction of the rear end 51c is generally identical to a dimension in an up and down direction of the front end 52a of the rear section 52.

Figure 15:
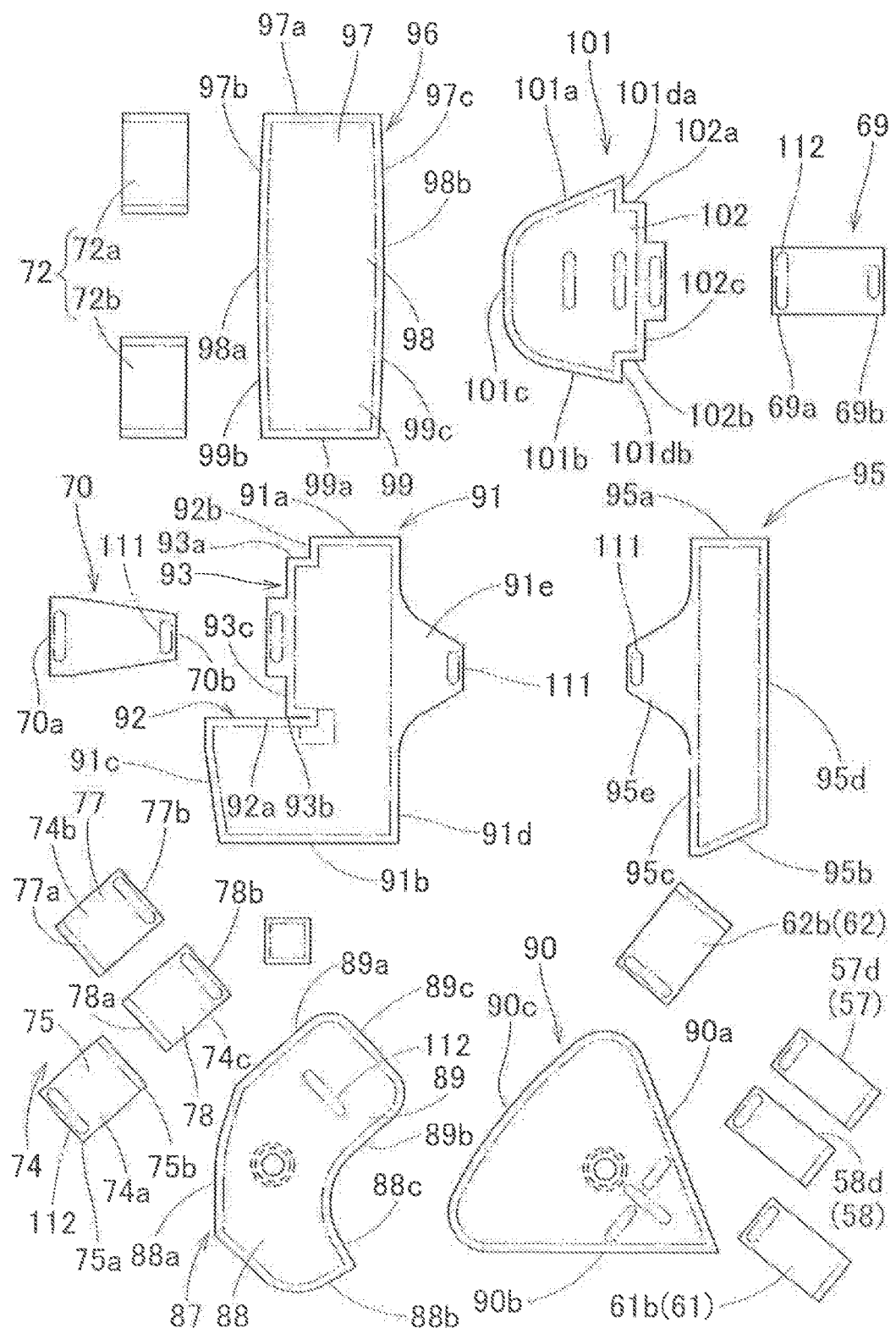

The rear section 52 is in a sheet shape, and is composed of later-described extended regions 91e and 95e each of which is integral with later-described rear left panel 91/rear right panel 95, which form the rear side wall 29 of the main inflatable section 17, and extends from an inner circumferential edge (right edge 91d/left edge 95c) of the rear left panel 91/rear right panel 95 (FIGS. 9, 11 and 15). In other words, the rear section 52 has a double-wall structure and is integral with the rear left panel 91 and rear right panel 95. More specifically, the rear section 52 is formed into such a generally trapezoid that enlarges toward the rear end 52b in an up and down direction from the front end 52a jointed to the front section 51. The airbag 15 is designed to deploy the front end 52a of the rear section 52 of the front-rear tether 50 at a generally center in an up and down direction of the main inflatable section 17.

The front-rear tether 50 is provided for limiting a clearance between the periphery of the gas inlet port 21 and a generally center in a left and right direction of the rear side wall 29 at airbag deployment in order to prevent the rear side wall 29 from protruding unduly rearward toward the passenger MP in an initial stage of airbag deployment. As shown in FIGS. 11 and 12, at airbag deployment, the front-rear tether 50 pulls and deploys the rear side wall 29 such that a region on the center line CL which passes through the mounting center C in a front and rear direction is slightly recessed forward over a generally entire area in an up and down direction. Further, as shown in FIGS. 11 and 12, the terminal (right end 70b) of the later-described auxiliary regulating tether 70 is sewn together by a seam 111 which sews the rear end 51c of the front section 51 and the front end 52a of the rear section 52 of the front-rear tether 50. Thus the terminal (right end 70b) of the auxiliary regulating tether 70 is jointed with the front-rear tether 50. Moreover, the front-rear tether 50 of the illustrated embodiment is disposed to pass through a void space formed between the left-right tethers 57 and 62 by the front section 51, although the detailed depiction is omitted.

As shown in FIGS. 4, 9 and 11, the two vertical tethers 54 and 55 are disposed side by side in a left and right direction at the same position in a front and rear direction inside the main inflatable section 17. In the illustrated embodiment, the vertical tethers 54 and 55 are located at the rear of the mounting region 20 of the main inflatable section 17 and in front of the left-right tethers 57, 58, 61 and 62. Further, the vertical tethers 54 and 55 are located on the left and right sides of the front-rear tether 50. Each of the vertical tethers 54 and 55 is formed by joining together a pair of base cloths 54a and 54b/55a and 55b each of which are disposed one above the other. In the illustrated embodiment, each of the vertical tethers 54 and 55 is disposed such that the width direction extends generally along a left and right direction, and the tethers 54 and 55 are generally identical in width in a left and right direction. The vertical tethers 54 and 55 limit the clearance between the upper wall 18a and lower wall 18b of the main inflatable section 17 for regulating the outer contour of the main inflatable section 17 as deployed.

The four left-right tethers 57, 58, 61 and 62 are located in a region at the rear of the vertical tethers 54 and 55 inside the main inflatable section 17, and each connect the front region 18ca of the left side wall 18c (i.e. the right side face 27a of the circumventing recess 27) and the right side wall 18d. Each of the left-right tethers 57, 58, 61 and 62 limits the clearance between the front region 18ca of the left side wall 18c and the right side wall 18d of the main inflatable section 17 for regulating the outer contour of a region in a vicinity of the circumventing recess 27 as deployed.

Figure 5:
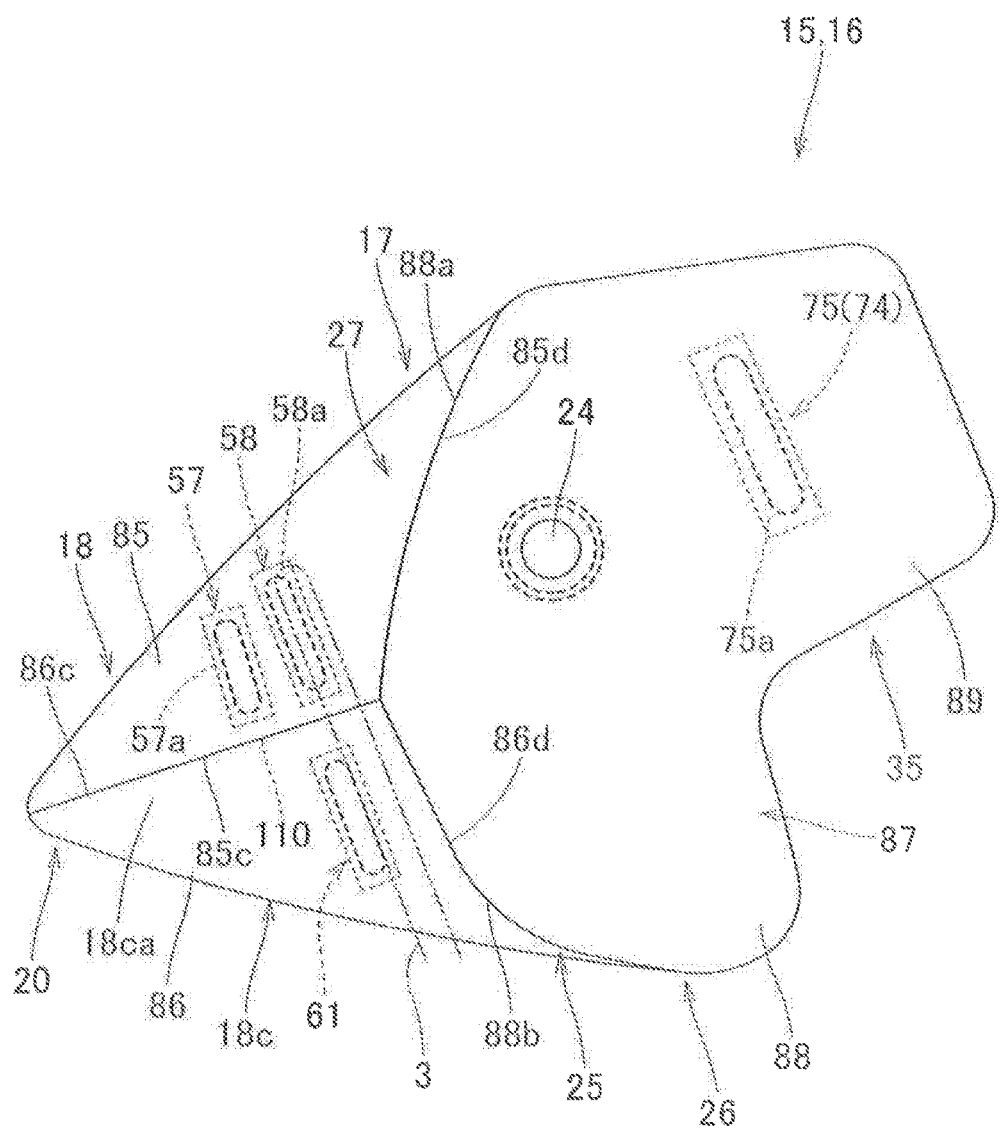
FIG. 5 is a left side view of the airbag of FIG. 3 as inflated by itself.
Figure 6:
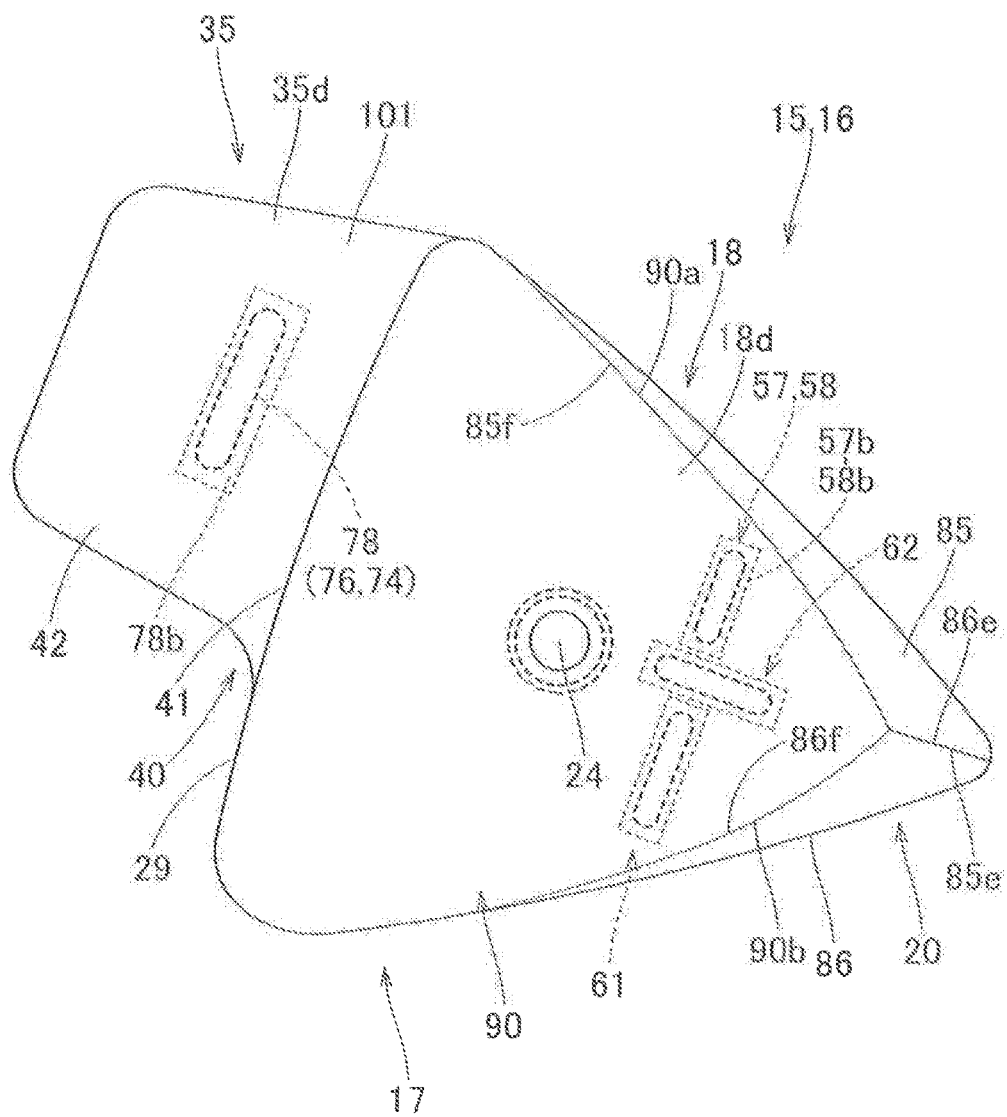
FIG. 6 is a right side view of the airbag of FIG. 3 as inflated by itself.

The left-right tethers 57 and 58, which are disposed on the upper side, are disposed one behind the other at a position slightly above the center in an up and down direction of the main inflatable section 17, in such a manner that the width direction extends along an up and down direction. As shown in FIGS. 3, 5 and 6, the right ends 57b and 58b of the left-right tethers 57 and 58 are bundled and sewn together to the right side wall 18d while the left end 57a of the tether 57 and the left end 58a of the tether 58 are sewn to the left side wall 18c at positions dislocated in a front and rear direction. Each of the left-right tethers 57 and 58 is formed by joining together a pair of base cloths 57c and 57d/58c and 58d each of which are disposed side by side in a left and right direction.

The left-right tether 61 is disposed immediately below the left-right tether 58 and below the center in an up and down direction of the main inflatable section 17, in such a manner that the width direction extends along an up and down direction. The left-right tether 62 is disposed between the left-right tethers 57 and 58 and the left-right tether 61, generally at the center in an up and down direction of the main inflatable section 17. The left-right tether 62 is disposed in such a manner that the width direction extends along a front and rear direction. The left end of the left-right tether 62 is jointed to the front region 18ca of the left side wall 18c by being sewn together when the left front edges 85c and 86c of later-described upper panel 85 and lower panel 86 are sewn together to form the main inflatable section 17. Each of the left-right tethers 61 and 62 is formed by joining together a pair of base cloths 61a and 61b/62a and 62b each of which are disposed side by side in a left and right direction.

In the illustrated embodiment, the left-right tethers 57, 58, 61 and 62 have an identical length L3 (FIG. 11), which specifically refers to the sum of lengths of the base cloths 57c and 57d, 58c and 58d, 61a and 61b or 62a and 62b in an unfolded state. The length L3 is smaller than the width L4 (FIG. 14) in a left and right direction of the front end region of the upper panel 85 or lower panel 86 of the main inflatable section 17 in an unfolded state. The length L3 is such a length that is capable of forming the circumventing recess 27 in front of the left region 25 (i.e. auxiliary inflatable section) in order for the airbag 15 to circumvent and avoid an engagement with the monitor 3 of the car navigation system at airbag deployment. The left-right tethers 57, 58, 61 and 62 limit the clearance between the front region 18ca of the left side wall 18c and the right side wall 18d of the main inflatable section 17 and prevent the front region 18ca of the left side wall 18c from protruding towards the left, thus helps form the circumventing recess 27 at airbag deployment. In the illustrated embodiment, the four left-right tethers 57, 58, 61 and 62 are disposed one above and behind another, and the left ends 57a and 58a of the left-right tethers 57 and 58 are disposed one behind the other, in a dislocated manner. This configuration helps prevent an extended area of the front region 18ca of the left side wall 18c from protruding towards the left and maintain the circumventing recess 27 in a recessed state adequately.

The recess-pulling tether 65, which is disposed inside the left region 25 (auxiliary inflatable section) of the main inflatable section 17 for pulling the arresting recess 43, extends diagonally left and forward from the arresting recess 43, as shown in FIG. 11. The recess-pulling tether 65 connects the leading end (the front end 43a) of the arresting recess 43 with the rear side of the circumventing recess 27 in the left region 25 (auxiliary inflatable section), i.e. with the intermediate region 18cb of the left side wall 18c, so as to be deployable generally along the moving direction D of the passenger's head MH which moves diagonally forward, as shown in FIGS. 11 and 12. The recess-pulling tether 65 of the illustrated embodiment extends from a position proximate to the right end of the intermediate region 18cb, which position is in a vicinity of the left end of the left-right tether 62. More specifically, as described above, the recess-pulling tether 65 and the arresting recess 43 are disposed at a slant with respect to a front and rear direction, with the inclination angle θ (FIG. 12) of about 20 degree (about 15 to 25 degree) with respect to the front and rear direction (with respect to the center line CL passing through the mounting center C along a front and rear direction). The recess-pulling tether 65 of the illustrated embodiment is composed of a band-shaped base cloth 66 (FIG. 14). As shown in FIGS. 8 and 11, the recess-pulling tether 65 is deployable in such a twisted fashion that the rear end 65b jointed to the front end or leading end 43a of the arresting recess 43 is disposed generally along an up and down direction while the front end 65a jointed to the intermediate region 18cb of the left side wall 18c is disposed generally along a left and right direction. In the illustrated embodiment, as shown in FIGS. 11 and 12, the front end 65a of the recess-pulling tether 65 is sewn together with a seam that sews the left front ends 85c and 86c of the upper panel 85 and lower panel 86 together, at the vicinity of the left end of the left-right tether 62 (specifically, on the left side of the left-right tether 62). The recess-pulling tether 65 helps deploy the arresting recess 43 along the moving direction of the passenger's head MH which moves diagonally forward, and prevents the arresting recess 43 from moving rearward at airbag deployment.

The regulating tether 69 is provided for preventing a rear end portion 37 of the protruding inflatable section 35 from drawing away from the main inflatable section 17 when the head MH of the passenger MP is caught in the arresting recess 43 at airbag deployment. As shown in FIGS. 3, 4, 7, 11 and 12, the regulating tether 69 extends from the leading end (the front end 43a) of the arresting recess 43 to the left side wall (which will also be called hereinafter a far-side wall) 35c of the protruding inflatable section 35.

Figure 7:
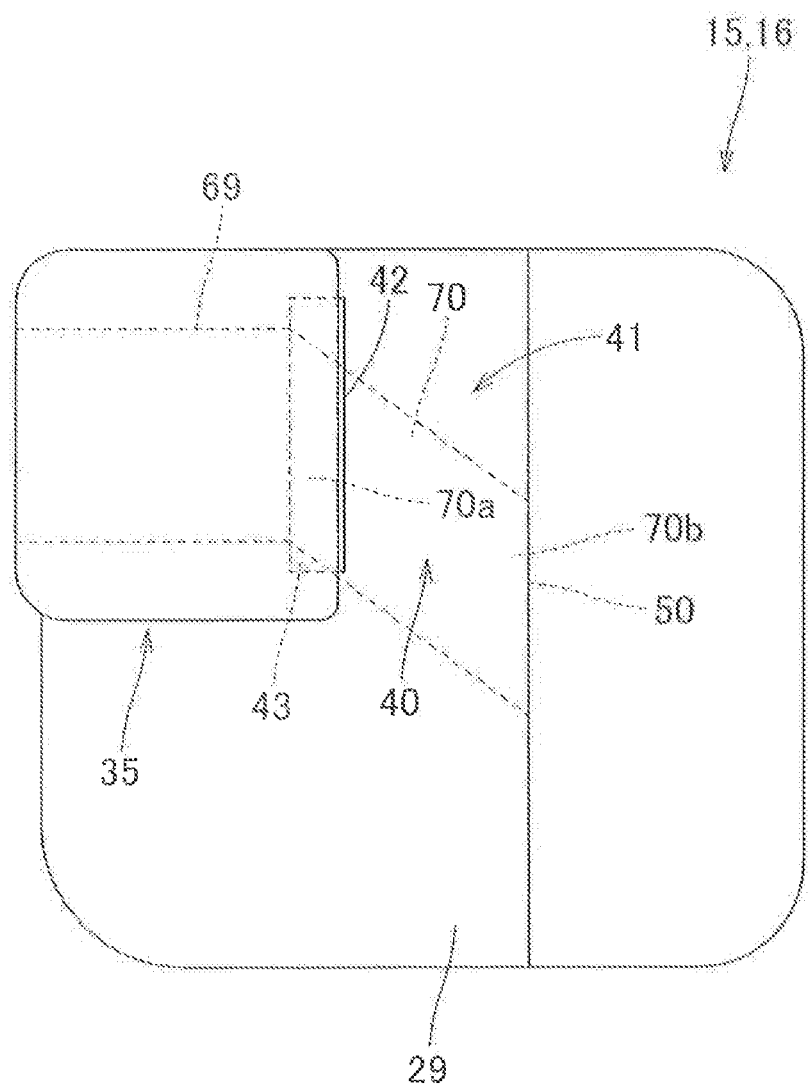
FIG. 7 is a front elevation of the airbag of FIG. 3 as inflated by itself.

More specifically, the regulating tether 69 is designed, at airbag deployment, to extend from the leading end (the front end 43a) of the arresting recess 43 to the left side wall (i.e. far-side wall) 35c of the protruding inflatable section 35 which is opposed to the right side wall 35d (i.e. the oblique-collision arresting face 42), and connects the leading end (the front end 43a) of the arresting recess 43 and the left side wall 35c. In the illustrated embodiment, the regulating tether 69 is formed into a band, and the left end or distal end 69a is sewn to the left side wall 35c while the right end or root end 69b to the front end 43a of the arresting recess 43 so as to be deployable generally horizontally as shown in FIG. 7. The joint position P (FIG. 12), at which the regulating tether 69 is jointed to the left side wall 35c by the left end (distal end) 69a, is such a position that would produce a pulling force which pulls the protruding inflatable section 35 towards the rear side (rear side wall 29) of the main inflatable section 17 when the arresting recess 43 catches the passenger's head MH and the leading end or front end 43a of the arresting recess 43 moves forward. More particularly, as shown in FIG. 12, the regulating tether 69 is designed to be deployed generally orthogonally to the arresting recess 43 or to the recess-pulling tether 65, in a view from above or below the airbag 15 as deployed. That is, referring to FIG. 12, if a straight line is drawn to connect the opening 44 of the arresting recess 43 and the front end 43a of the arresting recess 43 to which the right end 69b of the tether 69 is jointed (i.e. along the moving direction D of the passenger's head MH), the left end 69a of the regulating tether 69 is located on an intersection point CP of the left side wall 35c and a straight line LN which is generally orthogonal to the said straight line. In the illustrated embodiment, moreover, the joint position P at which the left end 69a of the regulating tether 69 is jointed to the left side wall 35c is a generally center in a front and rear direction of the left side wall 35c. In other words, the joint position P is located further rearward than the rear end 43b or opening 44 of the arresting recess 43 when the airbag 15 as deployed is viewed from an up or down direction.

Figure 10:
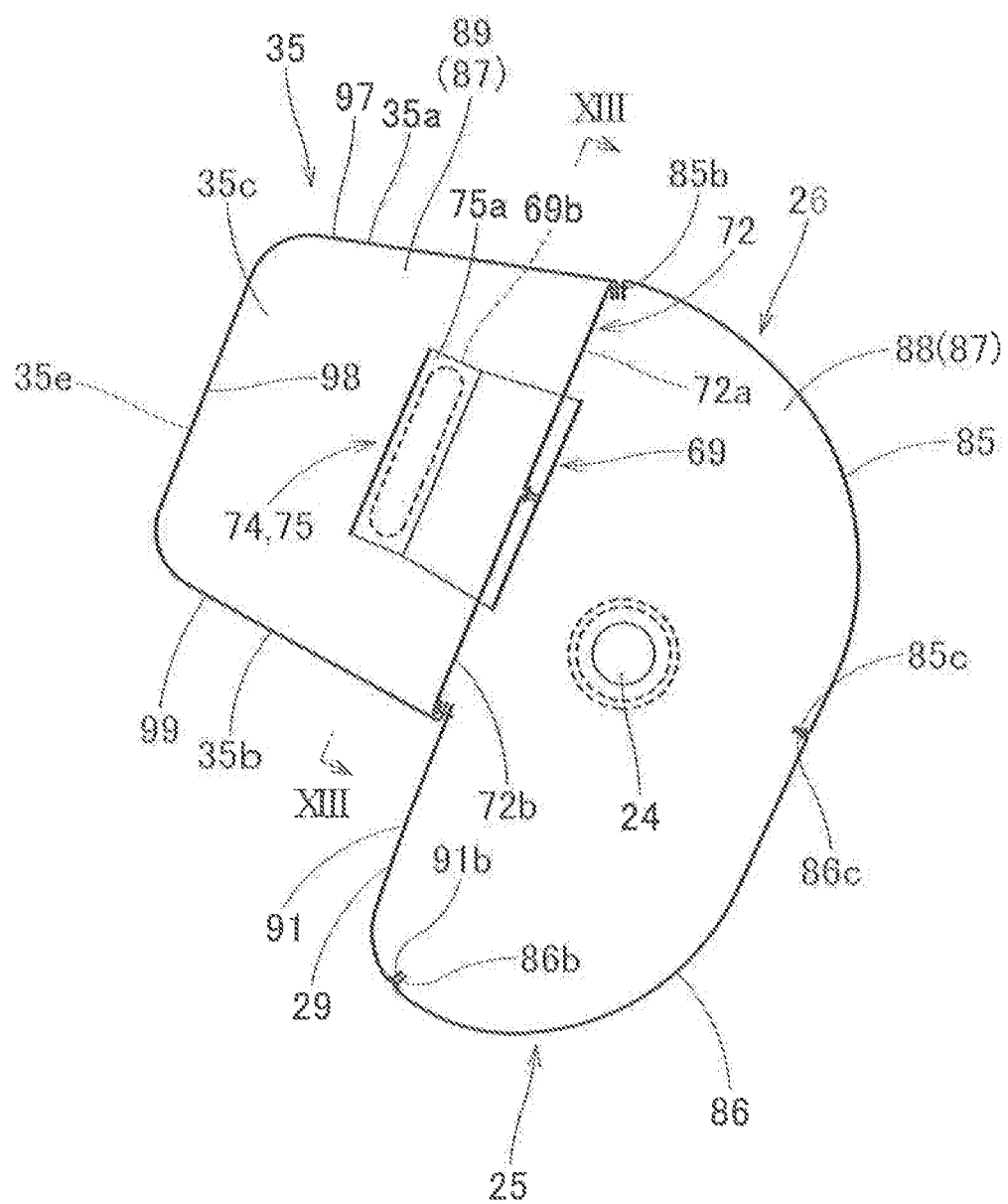
FIG. 10 is a schematic vertical section of the airbag of FIG. 3 taken at the location of a protruding inflatable section.

In the illustrated embodiment, as shown in FIGS. 10 and 12, the regulating tether 69 is designed to be deployed in front of and in proximity to the vertical tether 72 at airbag deployment. The left end 69a of the regulating tether 69 is sewn together with a seam 112 which sews the left end 75a of a later-described left region 75 of the left-right tether 74 to the left side wall 35c. That is, the left end 69a of the regulating tether 69 and the left end 75a of the left region 75 of the left-right tether 74 are sewn to the left side all 35c of the protruding inflatable section 35 together.

The auxiliary regulating tether 70 serving as the second regulating tether is designed to be deployed generally symmetrically with the regulating tether 69 with respect to the recess-pulling tether 65. The auxiliary regulating tether 70 extends from the leading end (the front end 43a) of the arresting recess 43 towards the main inflatable section 17 and the terminal (right end) 70b is jointed to a portion of the main inflatable section 17. As shown in FIGS. 11 and 12, the right end 70b of the illustrated embodiment is jointed to the front-rear tether 50. That is, the auxiliary regulating tether 70 extends towards the right from the leading end (the front end 43a) of the arresting recess 43 and connects the leading end (the front end 43a) of the arresting recess 43 and the front-rear tether 50. More specifically, as shown in FIGS. 11 and 12, the auxiliary regulating tether 70 is deployable generally orthogonally to the arresting recess 43 or to the recess-pulling tether 65 in a view from above or below the airbag 15 as deployed. In other words, the auxiliary regulating tether 70 is so deployable as to form a continuous straight line passing through the front end 43a of the arresting recess 43 in combination with the regulating tether 69. That is, the auxiliary regulating tether 70 is deployable generally symmetrically with the regulating tether 69 with respect to the arresting recess 43 (or to the recess-pulling tether 65). The auxiliary regulating tether 70 is jointed to the front-rear tether 50 by being sewn together, by the right end 70b, with a seam 111 which sews the rear end 51c of the front section 51 and the front end 52a of the rear section 52, of the front-rear tether 50, together (FIG. 12). The front end 52a of the rear section 52 of the front-rear tether 50 is disposed generally at the center in an up and down direction of the main inflatable section 17 as deployed, as viewed from the left or right as shown in FIG. 9, while the (leading end of ??) arresting recess 43 to which the root end or left end 70a of the auxiliary regulating tether 70 is sewn is deployed at a region above the center in an up and down direction of the airbag 15, as shown in FIG. 8. Accordingly, as shown in FIG. 7, the auxiliary regulating tether 70 is deployed at a slant with respect to a horizontal direction such that the right end 70b is disposed further downward than the left end 70a, as viewed from the front or rear.

As shown in FIGS. 10 and 13, the vertical tether 72 is disposed generally along an up and down direction at the generally center in a left and right direction of the communication region 36. More specifically, the vertical tether 72 connects the upper wall 35a and lower wall 35b of the protruding inflatable section 35 at a vicinity of the front end of the protruding inflatable section 35. The vertical tether 72 is formed generally into a band by joining together a pair of base cloths 72a and 72b which are disposed one above the other, as shown in FIGS. 10 and 13. The vertical tether 72 limits a clearance between the upper wall 35a and lower wall 35b at a vicinity of the boundary of the protruding inflatable section 35 and the auxiliary inflatable section (i.e. the left region 25 of the main inflatable section 17), i.e. at a vicinity of the communication region 36, in order to regulate the contour of the protruding inflatable section 35 as deployed.

The left-right tether 74 connects the left side wall 35c and right side wall 35d of the protruding inflatable section 35 inside the protruding inflatable section 35. The left-right tether 74 is disposed generally along a left and right direction such that the width direction extends generally along an up and down direction. As shown in FIGS. 11 and 12, the left-right tether 74 includes a left region 75 which is disposed towards the left side wall 35c and a right region 76 which is disposed toward the right side wall 35d. The right region 76 includes a front region 77 and a rear region 78 which bifurcate from the left region 75. The left end 75a of the left region 75 is jointed to a position slightly to the front of the center in a front and rear direction of the left side wall 35c of the protruding inflatable section 35. The right end 77b of the front region 77 of the right region 76 is jointed to a position in a vicinity of the front end of the right side wall 35d of the protruding inflatable section 35 and in a vicinity of the opening 44 of the arresting recess 43. The right end 78b of the rear region 78 of the right region 76 is jointed to a generally central position in a front and rear direction of the right side wall 35*d*. The right end 75*b* of the left region 75, the left end 77*a* of the front region 77 and the left end 78*a* of the rear region 78 are jointed (or sewn) together, thus the left-right tether 74 is deployed generally in a Y shape as viewed from an up or down direction. As shown in FIG. 12, the left-right tether 74 is composed of three pieces of base cloths 74*a*, 74*b* and 74*c*. Since the right ends 77*b* and 78*b* of the front region 77 and rear region 78 of the right region 76 are jointed to the right side wall 35*d* at different positions in a front and rear direction, the left-right tether 74 controls the deployment fashion of a front half area of the right side wall 35*d* over a broad area, as shown in FIGS. 8 and 12, and helps deploy the right side wall 35*d* (i.e. the oblique-collision arresting face 42) generally along a front and rear direction. As described above, the seam 112 which joints or sews the left end 75*a* of the left region 75 of the left-right tether 74 to the left side wall 35*c* also sews the left end 69*a* of the regulating tether 69 together to the left side all 35*c*, as shown in FIG. 12.

The bag body 16 is formed by sewing together circumferential edges of predetermined shaped base cloths. In the illustrated embodiment, as shown in FIGS. 14 and 15, the bag body 16 is composed of eight base cloths; an upper panel 85 deployable on the upper side, a lower panel 86 deployable on the lower side, a left panel 87 deployable on the left side, a right panel 90 deployable on the right side, a rear left panel 91 and a rear right panel 95 which are deployable on the rear side, a protruding-section main panel 96 which constitutes the upper region, the rear region and the lower region of the protruding inflatable section 35, a protruding-section right panel 101 which constitutes the right region of the protruding inflatable section 35, and additionally, two pieces of reinforcing cloths 105 and 106 for reinforcing the mounting region 20 of the bag body 16, a reinforcing cloth 107 for reinforcing the periphery of the gas inlet port 21, a protecting cloth 108 for protecting the periphery of the gas inlet port 21, and a reinforcing patch 109 for reinforcing an area in a vicinity of the boundary of the protruding inflatable section 35 and main inflatable section 17.

The upper panel 85 constitutes the upper wall 18*a* of the main inflatable section 17 and upper areas of the front region 18*ca* and intermediate region 18*cb* of the left side wall 18*c*. The lower panel 86 constitutes the lower wall 18*b* of the main inflatable section 17 and lower areas of the front region 18*ca* and intermediate region 18*cb* of the left side wall 18*c*. That is, the front region 18*ca* of the left side wall 18*c* which constitutes the right side face 27*a* of the circumventing recess 27 and the intermediate region 18*cb* of the left side wall 18*c* which constitutes the rear side face 27*b* of the circumventing recess 27 are composed of left front areas of the upper panel 85 and lower panel 86. The seam 110 which sews the left front edges 85*c* and 86*c* of the upper panel 85 and lower panel 86 together extends generally horizontally at a generally center in an up and down direction of the right side face 27*a* and rear side face 27*b* of the circumventing recess 27, as shown in FIG. 5. As shown in FIGS. 11 and 12, the seam 110 also sews the front end 65*a* of the recess-pulling tether 65 and the left end of the left-right tether 62 together.

The left panel 87 constitutes the rear region 18*cc* of the left side wall 18*c* of the left region or auxiliary inflatable section 25 (i.e. the left face of the supporting inflatable section 26) as deployed and the left side wall 35*c* of the protruding inflatable section 35. As shown in FIG. 15, the left panel 87 is formed into such a contour that a generally rectangular protruding region 89 which forms the left side wall 35*c* of the protruding inflatable section 35 is jointed to the rear upper end of a flat triangular body region 88 which forms the rear region 18*cc*. The right panel 90 constitutes the right side wall 18*d* of the main inflatable section 17 as deployed, and is generally triangular in outer contour.

The rear left panel 91 and the rear right panel 95 each form a left half region and a right half region of the rear side wall 29 of the main inflatable section 17 as deployed. In the illustrated embodiment, the rear left panel 91 constitutes the region of the rear side wall 29 which is disposed on the left side of the center line CL running through the mounting center C and extending generally along a front and rear direction while the rear right panel 95 forms the region of the rear side wall 29 on the right side of the center line CL. The rear left panel 91 has such a contour that the left upper region is cut out for providing gas communication between the main inflatable section 17 and protruding inflatable section 35. As shown in FIG. 15, a flap-like portion 93 is disposed in this cut-out region 92 for forming the right side wall 46 of the arresting recess 43. The flap-like portion 93 is formed into a generally rectangle elongated in an up and down direction and protrudes towards the left out of the right edge 92*b* of the cut-out region 92 of the rear left panel 91 as developed flatly. More specifically, the width in an up and down direction of the flap-like portion 93 is slightly smaller than that of the cut-out region 92 (i.e., the length of the right edge 92*b*), and the center in an up and down direction of the flap-like portion 93 is disposed below the center in an up and down direction of the cut-out region 92 such that the lower edge 93*b* is proximate to the lower edge 92*a* of the cut-out region 92. Each of the rear left panel 91 and rear right panel 95 is provided, at the right edge 91*d*/left edge 95*c* (i.e. at the inner circumferential edge), an extended region 91*e*/95*e* for forming the rear section 52 of the front-rear tether 50.

The protruding-section main panel 96 includes an upper-wall region 97 for forming the upper wall 35*a*, a rear-wall region 98 for forming the rear side wall 35*e*, and a lower-wall region 99 for forming the lower wall 35*b*, of the protruding inflatable section 35 as deployed. The protruding-section main panel 96 has such a generally band-shaped outer contour that the upper-wall region 97, the rear-wall region 98 and the lower-wall region 99 are lined up.

The protruding-section right panel 101 forms the right side wall 35*d* of the protruding inflatable section 35 as deployed, and is formed into a generally trapezoid slightly narrowing towards the rear edge 101*c*. A flap-like portion 102 for forming the left side wall 45 of the arresting recess 43 is disposed at the front edge 101*d* of the protruding-section right panel 101. The flap-like portion 102 is formed into a generally rectangle and protrudes out of the front edge 101*d* of the protruding-section right panel 101. The flap-like portion 102 is generally identical in outer contour to the flap-like portion 93 of the rear left panel 91, as shown in FIG. 15. More specifically, the width in an up and down direction of the flap-like portion 102 is slightly smaller than that of the front edge 101*d* of the protruding-section right panel 101, and the center in an up and down direction of the flap-like portion 102 generally coincides with the center in an up and down direction of the protruding-section right panel 101. That is, the front edge 101*d* of the protruding-section right panel 101 includes an upper region 101*da* and a lower region 101*db* above and below the flap-like portion 102. In the illustrated embodiment, the upper region 101*da* is to be jointed with the right edge 92*b* of the cut-out region 92 of the rear left panel 91, and the lower region 101*db* is to be jointed to a peripheral region 94 of the rear left panel 91 which is a peripheral region of the corner of the cut-out region 92. As shown in FIG. 13, the peripheral region 94 is reinforced with the separate reinforcing patch 109 having a generally rectangular outer contour. The reinforcing patch 109 reinforces a region in a vicinity of the boundary of the left region 25 (i.e. the supporting inflatable section 26) of the main inflatable section 17 and the protruding inflatable section 35, in other words, a joint of a region around the right front lower end corner of the protruding inflatable section 35 and the left region 25 (i.e. the supporting inflatable section 26). In the airbag 15 of the illustrated embodiment, as shown in FIGS. 8 and 13, regions around the joints of the upper region 101da and lower region 101db of the protruding-section right panel 101 to the rear left panel 91 (i.e. regions around peripheral areas 35f and 35g of the protruding inflatable section 35) constitute joint regions 47U and 47D which connect the front-collision arresting face 41 and oblique-collision arresting face 42 at the upper edge 43c and lower edge 43d of the arresting recess 43. More specifically, the lower joint region 47D is formed to ingress the patched area with the reinforcing patch 109 (i.e. to overlap with the seam 94a which sews the reinforcing patch 109 to the peripheral region 94).

The reinforcing cloths 105 and 106 are provided for reinforcing the mounting region 20 of the bag body 16. As shown in FIG. 14, each of the reinforcing cloths 105 and 106 has a generally trapezoidal contour shaped to the front region of each of the upper panel 85 and lower panel 86. The reinforcing cloth 107 for reinforcing the periphery of the gas inlet port 21 has a generally circular shape. The protecting cloth 108, which is generally rectangular in outer contour, is provided for covering the seam formed in the periphery of the gas inlet port 21 (more particularly, the seam (reference numeral omitted) which sews the front edges 85a and 86a of the upper panel 85 and lower panel 86 together) and protecting the seam from inflation gas.

In the illustrated embodiment, components of the bag body 16, i.e., the upper panel 85, lower panel 86, left panel 87, right panel 90, rear left panel 91, rear right panel 95, protruding-section main panel 96, protruding-section right panel 101, reinforcing cloths 105, 106 and 107, protecting cloth 108, reinforcing patch 109, base material 53 of the front section 51 of the front-rear tether 50, base cloths 54a, 54b, 55a and 55b of the vertical tethers 54 and 55, base cloths 57c, 57d, 58c, 58d, 61a, 61b, 62a and 62b of the left-right tethers 57, 58, 61 and 62, base cloth 66 for forming the recess-pulling tether 65, regulating tether 69, auxiliary regulating tether 70, base cloths 72a and 72b for forming the vertical tether 72 and base cloths 74a, 74b and 74c for forming the left-right tether 74, are made of a flexible woven fabric of polyester yarn, polyamide yarn or the like.

As shown in FIGS. 8 to 13, the bag body 16 of the illustrated embodiment is formed by sewing (jointing) corresponding circumferential edges of the upper panel 85, lower panel 86, left panel 87, right panel 90, rear left panel 91, rear right panel 95, protruding-section main panel 96, and protruding-section right panel 101 together with sewing threads. More specifically, the front edge 85a, left front edge 85c and right front edge 85e of the upper panel 85 are jointed with the front edge 86a, left front edge 86c and right front edge 86e of the lower panel 86. The rear edge 85b of the upper panel 85 is jointed with the front edge 97a of the upper-wall region 97 of the protruding-section main panel 96, the upper edge 91a of the rear left panel 91 and the upper edge 95a of the rear right panel 95. The left rear edge 85d of the upper panel 85 is jointed with the upper edge 88a of the body region 88 of the left panel 87. The right rear edge 85f of the upper panel 85 is jointed with the upper edge 90a of the right panel 90. The rear edge 86b of the lower panel 86 is jointed with the lower edges 91b and 95b of the rear left panel 91 and rear right panel 95. The left rear edge 86d of the lower panel 86 is jointed with the lower edge 88b of the body region 88 of the left panel 87. The right rear edge 86f of the lower panel 86 is jointed with the lower edge 90b of the right panel 90. The rear edge 88c of the body region 88 of the left panel 87 is jointed with the left edge 91c of the rear left panel 91. The upper edge 89a of the protruding region 89 of the left panel 87 is jointed with the left edge 97b of the upper-wall region 97 of the protruding-section main panel 96, the rear edge 89c is jointed with the left edge 98a of the rear-wall region 98 of the protruding-section main panel 96, and the lower edge 89b is jointed with the left edge 99b of the lower-wall region 99. The rear edge 90c of the right panel 90 is jointed with the right edge 95d of the rear right panel 95. The right edge or inner circumferential edge 91d of the rear left panel 91 is jointed with the left edge or inner circumferential edge 95c of the rear right panel 95. The lower edge 92a of the cut-out region 92 of the rear left panel 91 is jointed with the front edge 99a of the lower-wall region 99 of the protruding-section main panel 96. The right edge 92b of the cut-out region 92 of the rear left panel 91 is jointed with the upper region 101da of the front edge 101d of the protruding-section right panel 101. The upper edge 93a, lower edge 93b and front edge 93c of the flap-like portion 93 of the rear left panel 91 are each jointed with the upper edge 102a, lower edge 102b and front edge 102c of the flap-like portion 102 of the protruding-section right panel 101. The right edge 97c of the upper-wall region 97, the right edge 98b of the rear-wall region 98 and the right edge 99c of the lower-wall region 99 of the protruding-section main panel 96 are each jointed with the upper edge 101a, rear edge 101c and lower edge 101b of the protruding-section right panel 101. The lower region 101db of the front edge 101d of the protruding-section right panel 101 is jointed to the peripheral region 94 of the rear left panel 91, which is the peripheral region of the corner of the cut-out region 92, as described above.

Figure 18A:
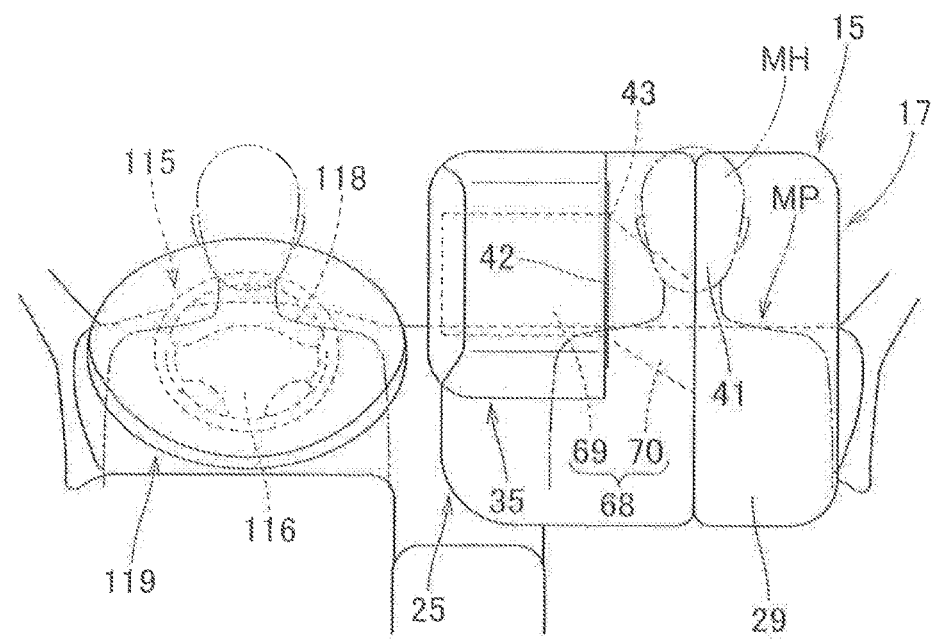
FIG. 18A is a schematic front elevation of the airbag device of the embodiment as has completed deployment before catching a passenger.
Figure 18B:
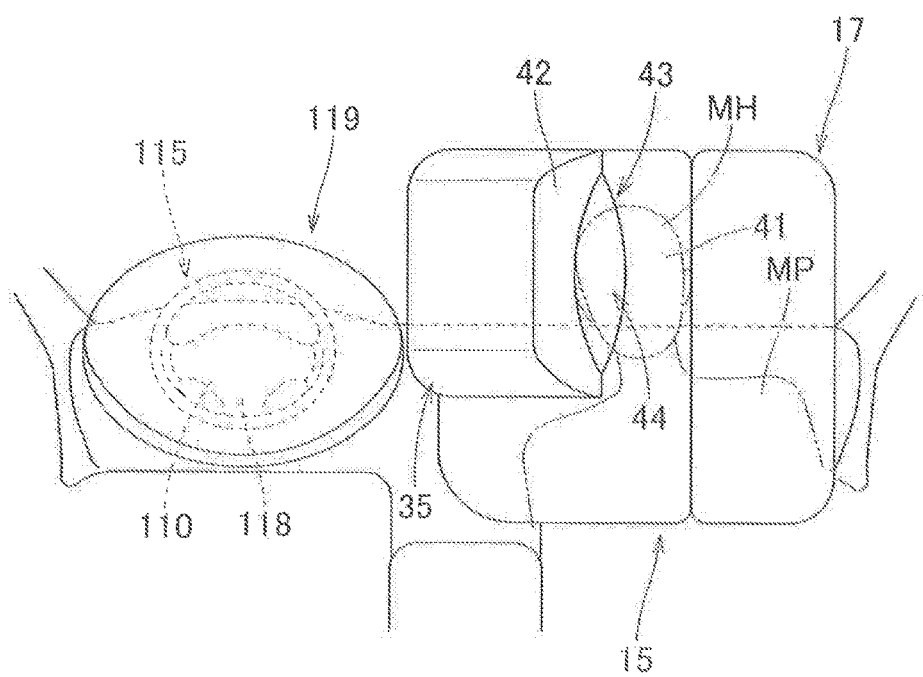
FIG. 18B is a schematic front elevation of the airbag device of the embodiment as has completed deployment after catching the passenger.

The steering wheel 115 located in front of the driver's seat DS, which is on the left of the front passenger seat PS, is provided with an airbag device 118 for a steering wheel. The airbag device 118 includes an airbag 119 for a steering wheel which is stored in a boss section 116 disposed at the center of the steering wheel 115 in an folded-up configuration, and an inflator (not-shown) for feeding the airbag 119 with inflation gas. The airbag 119 is fabricated of a flexible sheet material and inflatable with an inflation gas fed from the inflator to cover the top surface (i.e., rear surface) of the steering wheel 115 entirely (FIGS. 2 and 18). In a similar fashion to the inflator 8 of the airbag device M for a front passenger seat, the inflator of the airbag device 118 for a steering wheel is designed to be actuated in the event of a frontal collision, an oblique collision and an offset collision of the vehicle V.

Mounting of the airbag device M on the vehicle V is now described. Firstly, the retainer 9 is housed inside the airbag 15, and the airbag 15 is folded up to be housed in the case 12. Then a breakable wrapping sheet is wrapped around the airbag 15 for keeping the folded-up configuration. Then the airbag 15 is placed on the bottom wall 12a of the case 12, and the main body 8a of the inflator 8 is set in the case 12 from the lower side of the bottom wall 12a, such that the bolts 9a projecting downwardly from the bottom wall 12a are put through the flange 8c of the inflator 8. If then the bolts 9a projecting out of the flange 8c of the inflator 8 are fastened with nuts 10, the airbag 15 and the inflator 8 are mounted on the bottom wall 12*a* of the case 12.

Thereafter, the circumferential wall 12*b* of the case 12 is attached to the joint wall 6*c* of the airbag cover 6 on the dashboard 1, which has been mounted on board, and the unillustrated bracket of the case 12 is secured to the vehicle body structure. Thus the airbag device M is mounted on the vehicle V.

After the airbag device M for a front passenger seat of the illustrated embodiment is mounted on the vehicle V, in the event of a frontal collision, an oblique collision or an offset collision of the vehicle V, the inflator 8 discharges an inflation gas from the gas discharge ports 8*b* to inflate the airbag 15. Then the airbag 15 pushes and opens the doors 6*a* and 6*b* of the airbag cover 6, protrudes out of the case 12 via an opening formed by the opening of the doors 6*a* and 6*b*, and is deployed upward and rearward in such a manner as to fill up a space between the top lane 2 of the dashboard 1 and the windshield 4, as indicated by double-dotted lines in FIGS. 1 and 2 and as shown in FIGS. 16 and 18. At the same time, the airbag 119 for the steering wheel is also inflated with an inflation gas and is deployed over the top surface (i.e., rear surface) of the steering wheel 115 (FIG. 18).

In the airbag device M of the foregoing embodiment, the airbag 15 includes, between the front-collision arresting face 41 and oblique-collision arresting face 42 which rises rearward out of the front-collision arresting face 41, the arresting recess 43 which is recessed forward for receiving and arresting the passenger's head MH. Accordingly, in the event of an oblique collision or offset collision of the vehicle V, the airbag 15 is able to arrest the passenger's head MH by guiding the head MH by the oblique-collision arresting face 42 into the arresting recess 43 as he moves diagonally forward, as shown in FIGS. 16 and 18. At this time, at least a part of the passenger's head MH will thrust itself into the arresting recess 43 while opening the recess 43 toward the left and right, such that the head MH will be caught by a large arresting area composed of inner surfaces of the arresting recess 43 (i.e. the left side wall 45 and right side wall 46) and a kinetic energy of the head MH will be absorbed as it goes into the arresting recess 43. Accordingly, the arresting recess 43 will cushion the front and laterals of the head MH softly with the inner surfaces (i.e. the left side wall 45 and right side wall 46). Moreover, since the arresting recess 43 will contact both laterals of the head MH by the left side wall 45 and right side wall 46, it will not turn the head MH in a left and right direction when cushioning the head MH. As a consequence, the airbag device M of the foregoing embodiment will cushion the passenger's head MH smoothly with the arresting recess 43 in the event of an oblique collision or an offset collision. At a frontal collision of the vehicle V, the airbag 15 of the airbag device M will catch the passenger's head MH with the front-collision arresting face 41.

Moreover, the airbag 15 of the airbag device M internally includes the recess-pulling tether 65 which connects the leading end (or front end) 43*a* of the arresting recess 43 and the front end portion of the airbag 15 as deployed (i.e. the front portion of the supporting inflatable section 26, in other words, the rear side face 27*b* of the circumventing recess 27). The recess-pulling tether 65 helps keep the arresting recess 43 recessed adequately and prevent the arresting recess 43 from moving or oscillating in a front and rear direction at airbag deployment, thus the arresting recess 43 will be deployed in place quickly. Further, since the recess-pulling tether 65 helps deploy the arresting recess 43 generally along the moving direction D of the head MH of the passenger MP which moves diagonally forward, the head MH will go into the arresting recess 43 generally along the direction that the arresting recess 43 is recessed, as indicated by double-dotted lines in FIG. 16. That is, the recess-pulling tether 65 will help prevent only either one of the inner surfaces (the left side wall 45 or right side wall 46) from being engaged with the passenger's head MH and enable the arresting recess 43 to catch the head MH in a balanced fashion with the inner surfaces (the left side wall 45 or right side wall 46). As a consequence, the arresting recess 43 will catch the head MH of the passenger MP without turning the head MH in a left and right direction.

Furthermore, the airbag 15 of the airbag device M internally includes the regulating tether 69 which connects the leading end (or front end) 43*a* of the arresting recess 43 and the far-side wall or left side wall 35*c* of the protruding inflatable section 35, which is opposed to the oblique-collision arresting face 42 (namely, a near-side wall), and the joint position P (i.e. the seam 112), at which the regulating tether 69 is jointed to the left side wall 35*c* by the left end (distal end) 69*a*, is such a position that would produce a pulling force which pulls the protruding inflatable section 35 towards the rear portion (rear side wall 29) of the main inflatable section 17 when the arresting recess 43 catches the passenger's head MH and the leading end or front end 43*a* of the arresting recess 43 moves forward. With this configuration, when the arresting recess 43 catches the passenger's head MH and the leading end or front end 43*a* of the arresting recess 43 moves forward along with the movement of the head MH, the regulating tether 69 will pull the rear end portion 37 of the protruding inflatable section 35 towards the rear portion (rear side wall 29) of the main inflatable section 17. That is, although the passenger's head MH may push the protruding inflatable section 35 towards a direction away from the main inflatable section 17 when guided by the oblique-collision arresting face 42 and going into the arresting recess 43, the regulating tether 69 will hold the rear end portion 37 of the protruding inflatable section 35 from drawing or moving away from the main inflatable section 17, such that the arresting recess 43 will adequately catch and protect the head MH of the passenger MP.

Therefore, the airbag device M for a front passenger seat of the illustrated embodiment is capable of protecting the passenger MP with the airbag 15 as he moves diagonally forward.

Figure 17A:
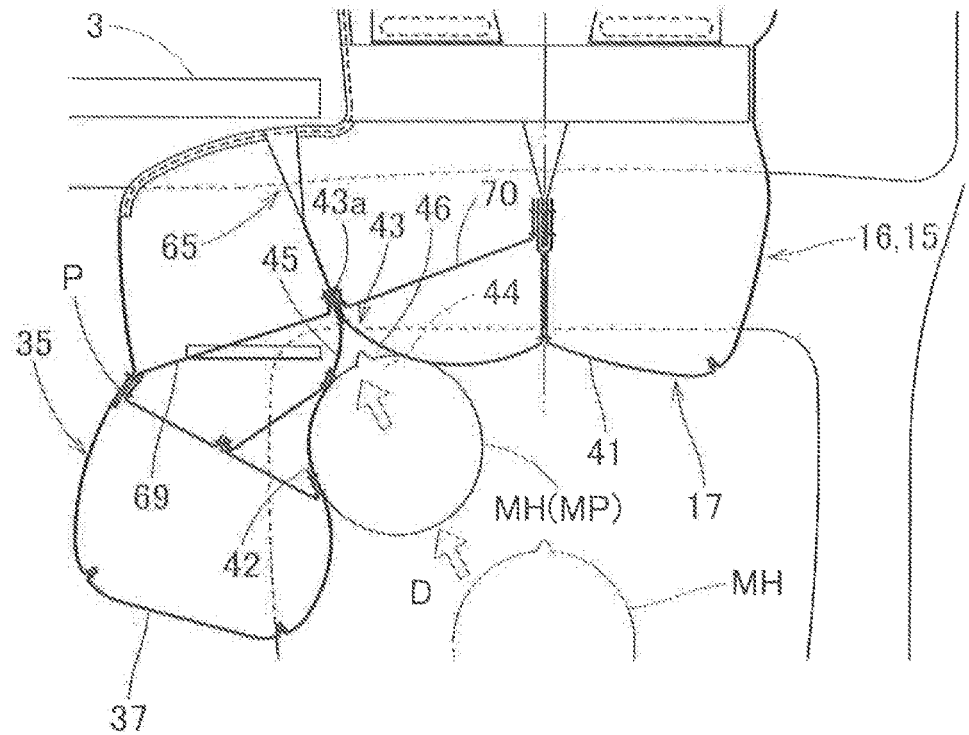
FIGS. 17A and 17B show a behavior of the airbag at catching the head of a passenger with an arresting recess by partial enlarged schematic horizontal sectional view.
Figure 17B:
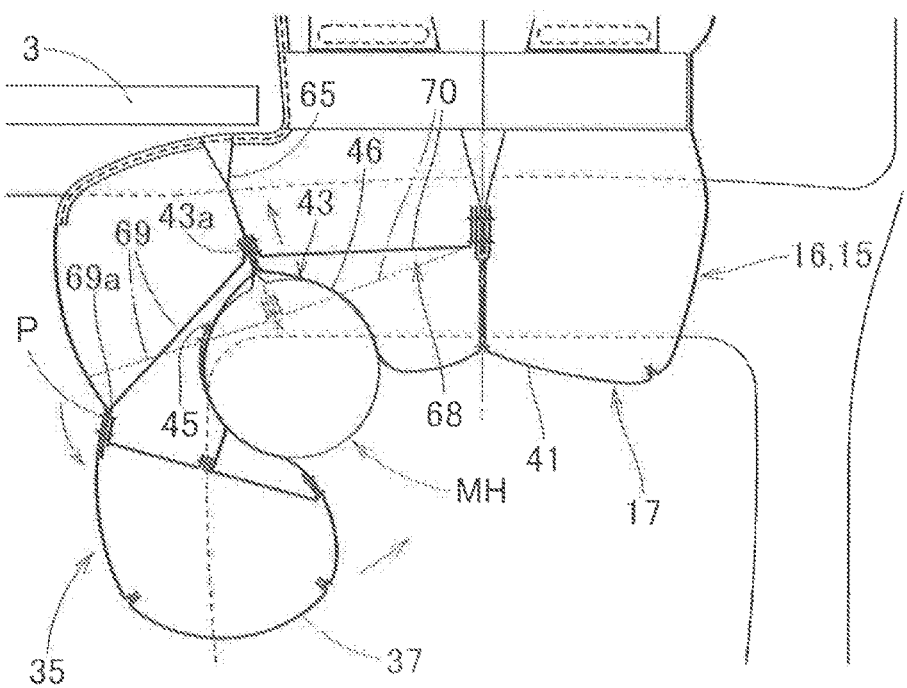

More specifically, if, as viewed from above or below the airbag as deployed, a straight line is drawn to connect the opening 44 and the front end 43*a* of the arresting recess 43, the joint position P (i.e. the seam 112) of the left end (distal end) 69*a* of the regulating tether 69 to the far-side wall (i.e. left side wall) 35*c* of the protruding inflatable section 35 is located on a position generally coincident with the intersection point CP of the left side wall 35*c* and the straight line LN drawn from the front end 43*a* of the arresting recess 43 generally orthogonally to the said straight line. With this configuration, when the head MH of the passenger MP moves diagonally forward and goes into the arresting recess 43, the rear end portion 37 of the protruding inflatable section 35 located at the rear of the joint position P may be once pushed away from the main inflatable section 17 or towards the center of the vehicle interior as shown in FIG. 17A, but when the leading end (front end 43*a*) of the arresting recess 43 moves forward along with the movement of the head MH, the right end 69*a* of the regulating tether 69, as it is jointed to the front end 43*a* of the arresting recess 43, will be moved forward together with the front end 43*a* of the arresting recess 43 as shown in FIG. 17B. Since the length of the regulating tether 69 does not change when it is tense, the left end 69a of the regulating tether 69 jointed to the left side wall 35c then will rotate or swing about the right end 69b and move towards the rear portion of the main inflatable section 17. Thus the rear end portion 37 of the protruding inflatable section 35 located at the rear of the joint position P (seam 112) will smoothly swing towards the rear portion (rear wall 29) of the main inflatable section 17 as shown in FIGS. 17A and 17B, and the head MH of the passenger MP will be adequately protected by the arresting recess 43.

In the airbag device M of the illustrated embodiment, the joint position P (i.e. the seam 112) of the left end (distal end) 69a of the regulating tether 69 to the far-side wall (i.e. left side wall) 35c of the protruding inflatable section 35 is located further rearward than the opening 44 of the arresting recess 43. With this configuration, the joint position P (or left end 69a) located further rearward than the arresting recess 43 will be more surely pulled or swing at the rear of the arresting recess 43 when the passenger's head MH is caught by the arresting recess 43, thus the rear end portion 37 of the protruding inflatable section 35 will smoothly swing towards the rear portion (rear side wall 29) of the main inflatable section 17 with the aid of the regulating tether 69.

Moreover, the airbag 15 of the illustrated embodiment includes the auxiliary or second regulating tether 70 that is deployable generally symmetrically with the regulating tether 69 with respect to the recess-pulling tether 65, and extends from the front end 43a of the arresting recess 43 towards the main inflatable section 17. The second regulating tether 70 will prevent the joint region of the regulating tether 69 to the front end 43a of the arresting recess 43 (i.e. the right end 69b of the regulating tether 69) from shifting towards the left side wall 35c due to a pressure of the head MH when the head MH of the passenger MP goes into the arresting recess 43 and the front end 43a of the arresting recess 43 moves forward, and help steady the position of the right end 69b of the regulating tether 69 around which the left end 69a rotates. Thus the regulating tether 69, in cooperation with the second regulating tether 70, will prevent the rear end portion 37 of the protruding inflatable section 35 from moving away from the main inflatable section 17 in a more adequate fashion when the airbag 15 catches the passenger's head MH. If such an advantageous effect does not have to be considered, the airbag 15 may be configured without such a second regulating tether.

Figure 19A:
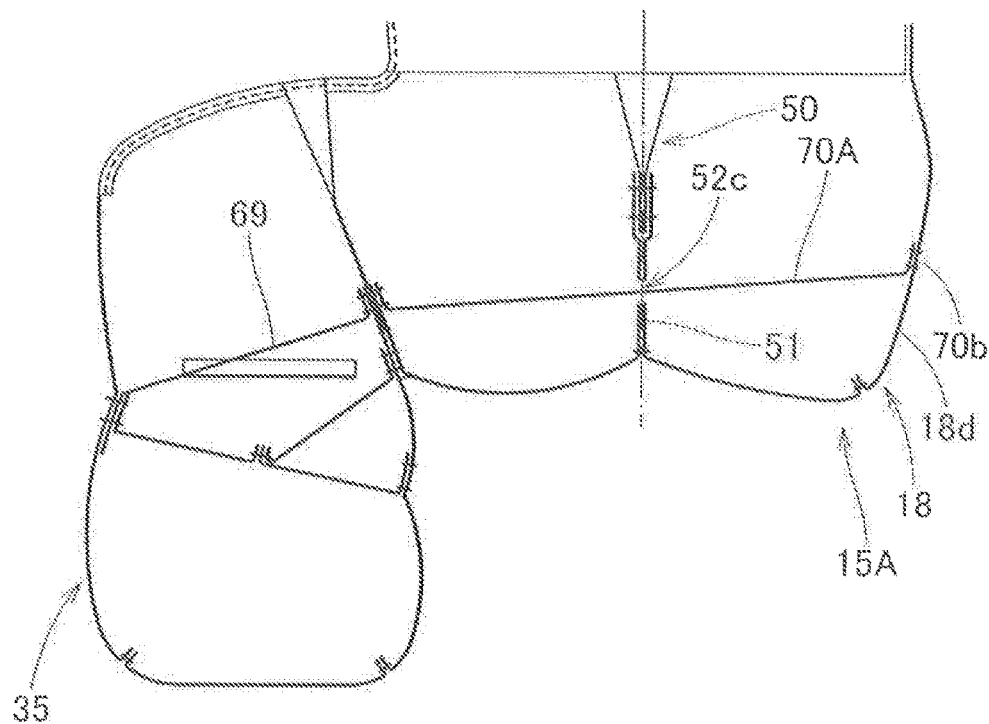
FIG. 19A is a partial enlarged schematic horizontal sectional view of an airbag according to an alternative embodiment of the invention.
Figure 19B:
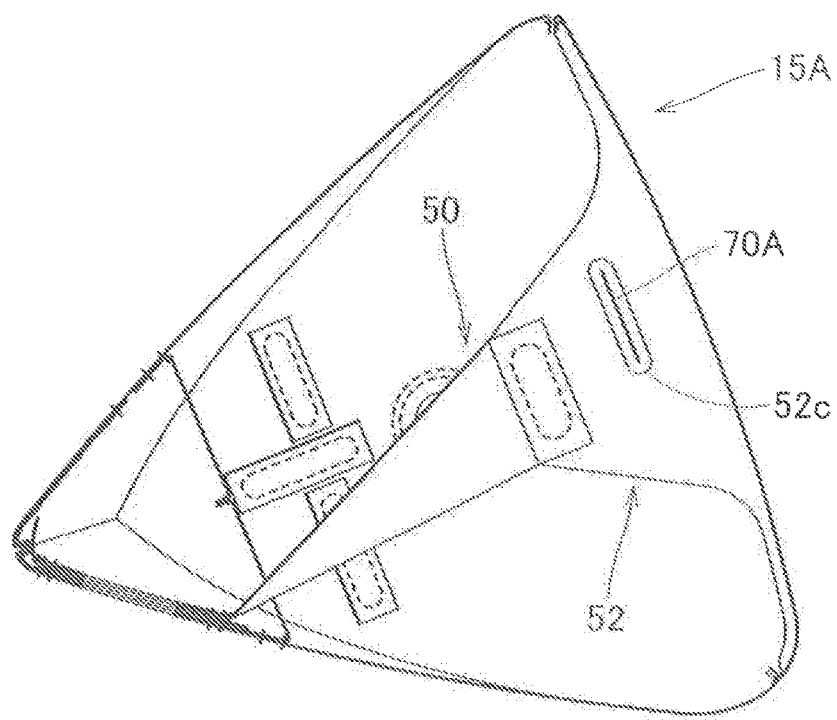
FIG. 19B is a schematic vertical sectional view of the airbag of FIG. 19A.
Figure 20A:
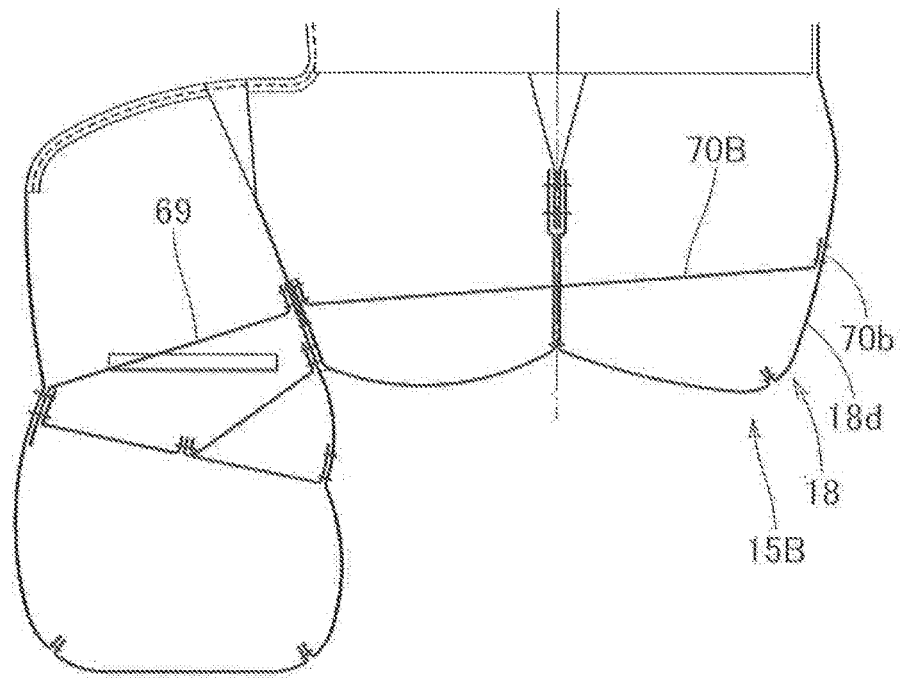
FIG. 20A is a partial enlarged schematic horizontal sectional view of an airbag according to another alternative embodiment of the invention.
Figure 20B:
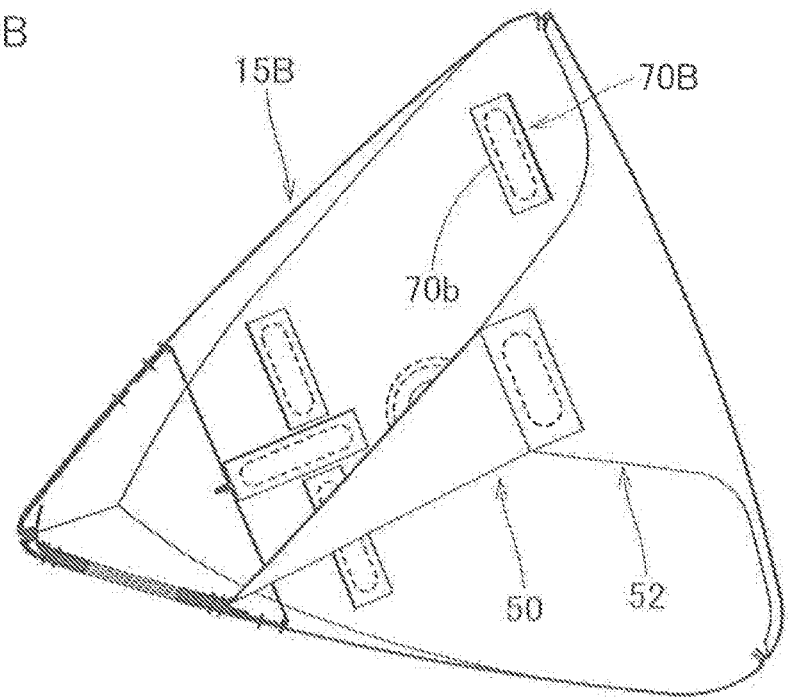
FIG. 20B is a schematic vertical sectional view of the airbag of FIG. 20A.

In the airbag device M of the illustrated embodiment, furthermore, the terminal or right end 70b of the auxiliary regulating tether 70 is jointed to the front-rear tether 50 disposed inside the airbag 15. In comparison with an instance where the terminal (right end) 70b of the auxiliary regulating tether 70 is jointed to an outer circumferential wall of the main inflatable section 17, this configuration will suppress the auxiliary regulating tether 70 from oscillating in a left and right direction at airbag deployment, and help steady the deployment of the arresting recess 43 quickly. The airbag 15 further includes, inside the main inflatable section 17, the front-rear tether 50 that connects a generally center in a left and right direction of the front-collision arresting face 41 and the front end portion of the main inflatable section 17. This front-rear tether 50 will prevent the front-collision arresting face 41 from being deployed unduly rearward in an initial stage of airbag deployment. In addition, in cooperation with the recess-pulling tether 65 disposed inside the protruding inflatable section 35, the front-rear tether 50 will suppress an undue oscillation in a front and rear direction of the whole airbag 15 at deployment and help inflate the airbag 15 quickly into a contour at full inflation. In such an advantageous effect does not have to be considered, the right end (terminal) 70b of the auxiliary regulating tether may be jointed to the right side wall 18d of the circumferential wall 18 of the main inflatable section 17, as in an airbag 15A shown in FIGS. 19A and 19B or in an airbag 15B shown in FIGS. 20A and 20B. In the airbag 15A shown in FIGS. 19A and 19B, an insert slot 52c is formed on the rear section 52 of the front-rear tether 50 such that an auxiliary regulating tether 70A may be put through the insert slot 52c and jointed to the right side wall 18d by the right end 70b. In the airbag 15B shown in FIGS. 20A and 20B, an auxiliary regulating tether 70B is configured to be deployed above the rear section 52 of the front-rear tether 50 and the right end 70b is jointed to the right side wall 18d.

In the airbag device M, the auxiliary inflatable section (i.e. the left region 25 of the main inflatable section 17) is disposed on a side of the main inflatable section 17 facing towards the center in the width direction of the vehicle V (i.e. on the left side of the main inflatable section 17). The auxiliary inflatable section includes, at the region deployable towards the dashboard 1 (i.e. in front of the protruding inflatable section 35), the supporting inflatable section 26 which supports the front side of the protruding inflatable section 35, and the supporting inflatable section 26 includes the circumventing recess 27 which is configured to circumvent the monitor 3 (i.e. an object which protrudes upward out of the dashboard 1). Accordingly, when mounted on a vehicle V equipped with a monitor 3 protruding out of the dashboard 1, the airbag 15 will be smoothly deployed without being engaged with the monitor 3. Further, the airbag 15 of the airbag device M includes the supporting inflatable section 26 which supports the front side of the protruding inflatable section 35 and the regulating tether 69 which prevents the rear end portion 37 of the protruding inflatable section 35 from drawing away from the main inflatable section 17 when the head MH of the passenger MP is caught in the arresting recess 43 at airbag deployment. With this configuration, when the arresting recess 43 catches the passenger's head MH, although the circumventing recess 27 is located forward of the protruding inflatable section 35, the front portion of the protruding inflatable section 35 will be adequately supported by the supporting inflatable section 26 and the rear end portion 37 of the protruding inflatable section 35 will be prevented from drawing away from the main inflatable section 17. Accordingly, the head MH will be caught by the arresting recess 43 in a steady fashion. If such an advantageous effect does not have to be considered, the airbag may be configured without a circumventing recess.

Moreover, in the foregoing embodiment, the protruding inflatable section 35 is disposed on the side of the main inflatable section 17 facing towards the driver's seat DS. In other words, the oblique-collision arresting face 42 and the arresting recess 43 are disposed towards the driver's seat DS with respect to the front-collision arresting face 41. This configuration will help protect the head MH of the passenger MP adequately when the front seat passenger MP moves diagonally forward towards the center in a width direction of the vehicle V in the event of an oblique collision or an offset collision. Although the passenger protection region 40 of the airbag 15 of the foregoing embodiment has the oblique-collision arresting face 42 and the arresting recess 43 only on the side of the front-collision arresting face 41 facing towards the driver's seat DS (i.e. on the left side of the front-collision arresting face 41), if the above-described advantageous effect does not have to be considered, the location of the oblique-collision arresting face and the arresting recess should not be limited thereby. By way of example, the oblique-collision arresting face and the arresting recess may be disposed only on the right side of the front-collision arresting face facing towards an outboard side, not towards the driver's seat, or on both left and right sides of the front-collision arresting face.

What is claimed is:

1. An airbag device for a front passenger seat adapted to be mounted on an instrument panel of a vehicle in front of a front passenger seat, the airbag device comprising a housing adapted to be disposed in the instrument panel and an airbag housed in the housing in a folded-up configuration and being inflatable with an inflation gas for rearward deployment, the airbag comprising:
   a main inflatable section deployable rearward out of the housing and comprising a rear plane that forms a front-collision arresting face for protecting a head of a passenger in an event of a frontal collision of the vehicle;
   an auxiliary inflatable section that is deployable on a left or right side of the main inflatable section;
   a protruding inflatable section that is deployable at a rear of the auxiliary inflatable section in such a manner as to protrude further rearward than the main inflatable section, the protruding inflatable section comprising a near-side wall that rises rearward out of the front-collision arresting face and faces towards the front-collision arresting face at airbag deployment and a far-side wall that is opposed to the near-side wall at the airbag deployment, the near-side wall forming an oblique-collision arresting face for protecting the head of the passenger as he moves diagonally forward in an event of an oblique collision or an offset collision of the vehicle;
   an arresting recess that is formed between the front-collision arresting face and the oblique-collision arresting face in such a manner as to be recessed forward for receiving and arresting the head of the passenger;
   a recess-pulling tether that joints, in an interior of the airbag, a leading end of the arresting recess and a front end portion of the airbag as deployed in order to deploy the arresting recess generally along a moving direction of the head of the passenger moving diagonally forward; and
   a regulating tether that prevents a rear end portion of the protruding inflatable section from drawing away from the main inflatable section when the head of the passenger is caught in the arresting recess at the airbag deployment, the regulating tether extending from the leading end of the arresting recess towards the far-side wall of the protruding inflatable section and jointing the leading end of the arresting recess and the far-side wall of the protruding inflatable section, wherein a position of a joint of the regulating tether to the far-side wall produces a pulling force which pulls the protruding inflatable section towards a rear portion of the main inflatable section when the arresting recess catches the head of the passenger and the leading end of the arresting recess moves forward.

2. The airbag device for a front passenger seat of claim 1, wherein, in a view from above or below the airbag as fully inflated, the position of the joint of the regulating tether to the far-side wall is located at a further rearward position than an intersection point of the far-side wall and a straight line which is drawn from the leading end of the arresting recess generally orthogonally to a line connecting an opening and the leading end of the arresting recess.

3. The airbag device for a front passenger seat of claim 1, wherein the position of the joint is located further rearward than an opening of the arresting recess, in a view from above or below the airbag as fully inflated.

4. The airbag device for a front passenger seat of claim 1, wherein:
   the auxiliary inflatable section is disposed on a side of the main inflatable section deployable towards a center in a width direction of the vehicle; and
   the auxiliary inflatable section includes, at a region thereof deployable towards the instrument panel, a supporting inflatable section that supports a front side of the protruding inflatable section, the supporting inflatable section including a circumventing recess that is configured to circumvent an object which protrudes upward out of the instrument panel.

5. The airbag device for a front passenger seat of claim 1, wherein the protruding inflatable section is disposed on a side of the main inflatable section deployable towards a driver's seat.

6. The airbag device for a front passenger seat of claim 1, wherein the airbag further comprises a second regulating tether that is deployable generally symmetrically with the regulating tether with respect to the recess-pulling tether, and that extends from the leading end of the arresting recess towards the main inflatable section and is jointed to a portion of the main inflatable section by a terminal thereof.

7. The airbag device for a front passenger seat of claim 6, wherein:
   the airbag further internally includes a front-rear tether that connects a general center in a left and right direction of the front-collision arresting face and a front end portion of the main inflatable section and is deployable generally along a front and rear direction for preventing the front-collision arresting face from moving rearward at airbag deployment; and
   the terminal of the second regulating tether is jointed to the front-rear tether.

* * * * *